(12) United States Patent
Nishimura et al.

(10) Patent No.: US 6,318,074 B1
(45) Date of Patent: Nov. 20, 2001

(54) CONTROL DEVICE FOR DIRECT INJECTION ENGINE

(75) Inventors: Hirofumi Nishimura; Youichi Kuji; Seiko Kono; Hiroyuki Yamashita; Keiji Araki, all of Fuchu-cho (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/382,662

(22) Filed: Aug. 25, 1999

(30) Foreign Application Priority Data

Aug. 26, 1998 (JP) .................................................. 10-240667

(51) Int. Cl.⁷ ...................................................... F01N 3/00
(52) U.S. Cl. ................... 60/284; 60/285; 60/286
(58) Field of Search ............................. 60/284, 286, 285, 60/301, 299, 300

(56) References Cited

U.S. PATENT DOCUMENTS

| | | | |
|---|---|---|---|
| 5,357,928 | * 10/1994 | Ohtsuka et al. | 60/284 |
| 5,642,705 | * 7/1997 | Morikawa et al. | 60/285 |
| 5,647,204 | 7/1997 | Atanasyan . | |
| 5,661,971 | * 9/1997 | Waschatz et al. | 60/285 |
| 5,727,384 | 3/1998 | Ma . | |
| 5,729,971 | * 3/1998 | Matsuno et al. | 60/277 |
| 5,806,482 | * 9/1998 | Igarashi et al. | 123/259 |
| 5,910,096 | * 6/1999 | Hepburn et al. | 60/286 |
| 5,975,046 | * 11/1999 | Kaneko et al. | 60/284 |
| 6,044,642 | * 4/2000 | Nishimura et al. | 60/284 |
| 6,141,960 | * 11/2000 | Takami et al. | 60/285 |

FOREIGN PATENT DOCUMENTS

| | | |
|---|---|---|
| 19755348A | 10/1998 | (DE) . |
| 0070619 | * 1/1983 | (EP) . |
| 0856655A | 8/1998 | (EP) . |
| 4-231645 | 8/1992 | (JP) . |
| 10169488 | 6/1998 | (JP) . |

* cited by examiner

Primary Examiner—Thomas Denion
Assistant Examiner—Diem Tran
(74) Attorney, Agent, or Firm—Nixon Peabody LLP; Donald R. Studebaker

(57) ABSTRACT

A control device for a direct injection engine includes an identifier for judging whether a catalyst is in its unheated state in which its temperature is lower than its activation temperature, an engine temperature state detector for sensing the temperature state of the engine, and a fuel injection controller for controlling fuel injection from the injector. The fuel injection controller controls an injector in such a way that it makes at least two-step split injection including an earlier injection cycle performed during an intake stroke and a later injection cycle performed in a middle portion of a compression stroke or later when the catalyst is in its unheated state, and the later injection cycle is retarded when the catalyst is still in its unheated state but the engine temperature has become higher than a specified temperature compared to a case where the temperature of the engine is equal to or lower than the specified temperature.

11 Claims, 13 Drawing Sheets

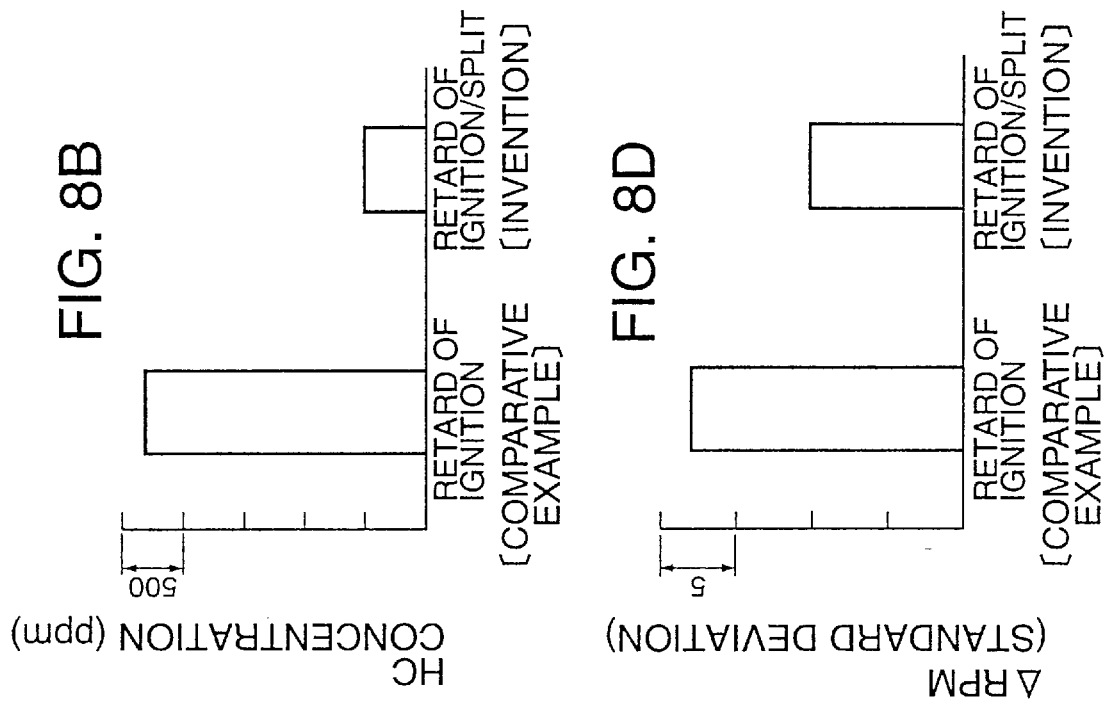
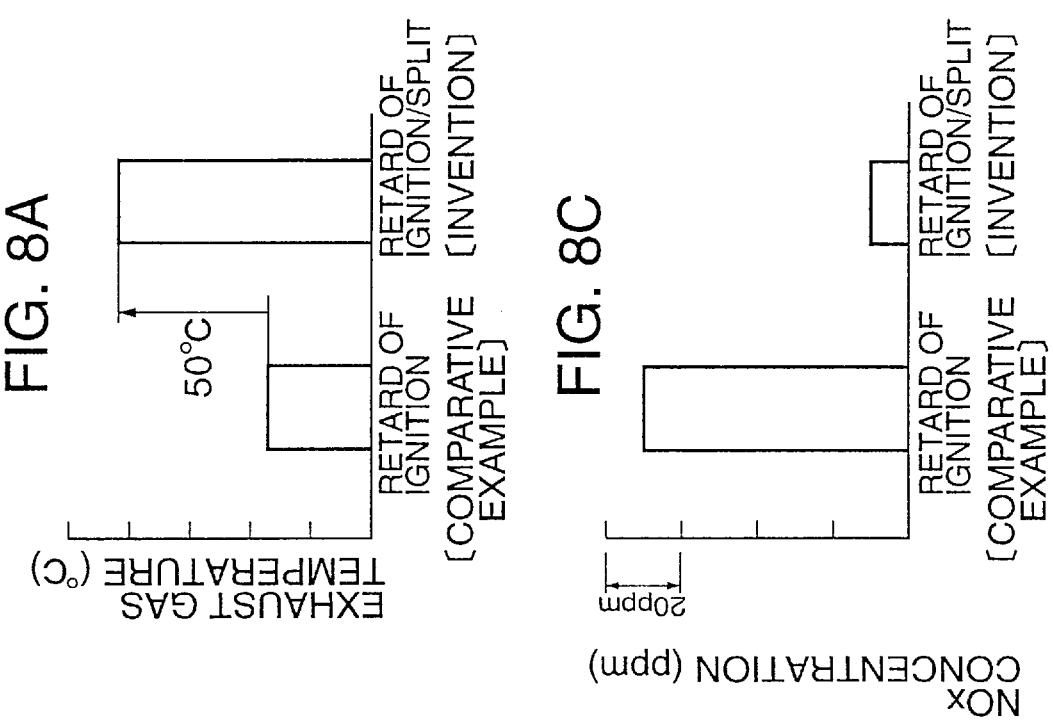

CONTROL DEVICE FOR DIRECT INJECTION ENGINE

BACKGROUND OF THE INVENTION AND RELATED ART STATEMENT

This invention relates to a control device for a direct injection engine provided with an injector which injects fuel directly into a combustion chamber.

A direct injection engine having an injector for injecting fuel directly into a combustion chamber is conventionally known. This engine is operated such that a condition in which a mixture is locally distributed around a spark plug is produced by injecting the fuel in a latter half of a compression stroke to perform so-called stratified charge combustion in a low-load state. This operation makes it possible to increase the air-fuel ratio to produce a leaner mixture while maintaining combustion stability and improve fuel economy.

Exhaust gases from engines of motor vehicles, for instance, contain hydrocarbons (HC), carbon monoxide (CO) and nitrogen oxides (NOx), and there exists a demand today for reducing generation and release of these harmful constituents as much as possible to achieve improved properties of these emissions. One approach that has conventionally been taken is to provide a catalyst in an exhaust gas passage, and it is a common practice in the aforementioned direct injection engine as well to provide a catalyst in its exhaust gas passage. A generally known example of such catalyst is a three-way catalyst which has the ability to clean out HC, CO and NOx approximately at the stoichiometric air-fuel ratio. Another example that has already been developed is a catalyst which can clean out NOx even in a "lean" operating range in order to be suited to lean burn operation by stratified charge combustion in the aforementioned direct injection engine or else.

A fuel injection control device disclosed in Japanese Unexamined Patent Publication No. 4-231645, for example, is known as a device for achieving an improvement in emission converting performance of a catalyst at low temperatures, for instance, in this type of direct injection engine. In a direct injection engine having a lean NOx catalyst provided in an exhaust gas passage, the lean NOx catalyst being of a type that requires HC for the reduction of NOx, this device is so arranged as to make primary injection from an injector in a latter part of a compression stroke, and make secondary injection in addition to the aforementioned primary injection to inject a small amount of fuel for supplying HC to the lean NOx catalyst within a period from an intake stroke to an early part of the compression stroke when the temperature of the catalyst is low, or make the secondary injection in addition to the aforementioned primary injection within a period from the latter half of the combustion stroke to an early part of an exhaust stroke when the temperature of the catalyst is high. In this device, HC derived from the fuel injected by the secondary injection is supplied to the catalyst in the exhaust gas passage by setting the amount of fuel injected by the secondary injection to such a small level that will scarcely affect combustion within a combustion chamber, and a low boiling-point constituent of HC is supplied to the catalyst in low-temperature conditions while a high boiling-point constituent of HC is supplied to the catalyst in high-temperature conditions by varying the timing of the secondary injection between the low-temperature and high-temperature conditions in the aforementioned manner.

While the secondary injection is made prior to the primary injection, which is made in the latter part of the compression stroke, when the temperature of the catalyst is low in the device disclosed in the aforementioned Publication, this secondary injection is intended to supply HC to the catalyst and is made in an extremely small such that the majority of the injected fuel would reach the catalyst without burning and serve to discharge HC into the exhaust gas passage. Therefore, this device is advantageous only when a lean NOx catalyst of the type that requires HC for the reduction of NOx is used. Moreover, the device makes it possible to exhibit NOx converting effects with the supply of HC only after the catalyst has been activated to a certain degree, though it is still in a low-temperature state. Since HC is released in an earlier unheated state than that point, the device does not have the function of performing the catalyst quick light-off operation as a result of an increase in the exhaust gas temperature under such conditions.

Although it is desirable that the state of combustion be adjusted such that the combustion in the combustion chamber itself enhances HC and NOx reduction effects and quick light-off effects due to the increased exhaust gas temperature while maintaining combustion stability when the catalyst is in its unheated state, in which its temperature is lower than its activation temperature, the device of the aforementioned Patent Publication does not sufficiently provide such effects.

Furthermore, the temperature state of an engine does not necessary coincide with that of a catalyst. For example, although the catalyst rapidly cools down when the engine is stopped, the engine temperature drops slowly. Therefore, if the engine is restarted before it fully cools down after it was once stopped, for instance, the engine may reach its heated condition, in which its temperature is higher than a specified temperature, when the catalyst is still in its unheated state. Fuel evaporation and atomization conditions within the combustion chamber could change if the engine temperature status varies when the catalyst is still in its unheated state. Although such changes in the fuel evaporation and atomization conditions could affect the combustion stability and quick light-off effects, for instance, due consideration has not been given to such points in the prior art.

SUMMARY OF THE INVENTION

It is an object of the invention to provide a control device for a direct injection engine which has overcome the problems residing in the prior art.

According to an aspect of the invention, a control device for a direct injection engine having a catalyst provided in an exhaust gas passage for converting exhaust gases and an injector for injecting fuel directly into a combustion chamber includes an identifier for judging whether the catalyst is in its unheated state in which its temperature is lower than its activation temperature, an engine temperature state detector for sensing the temperature state of the engine, and a fuel injection controller for controlling fuel injection from the injector. The fuel injection controller controls the injector based on judgment results of the identifier and on sensing results of the engine temperature state detector in such a way that the injector makes at least two-step split injection during a period from an intake stroke to an ignition point including a later injection cycle performed in a middle portion of a compression stroke or later and an earlier injection cycle performed prior to the later injection cycle when the catalyst is in its unheated state.

The direct injection engine can improve the properties of emissions and enhance quick light-off effects while maintaining combustion stability by reducing the amounts of HC, NOx and other emissions and increasing the exhaust gas temperature when a catalyst is in its unheated state, and especially by adjusting the state of combustion in accordance with the engine temperature status when the catalyst is in its unheated state.

These and other objects, features and advantages of the invention will become more apparent upon reading the following detailed description in conjunction with the accompanying drawings.

BRIEF DESCRIPTION OF THE DRAWINGS

FIGS. 8A to 8D present graphs showing the exhaust gas temperature, HC concentration, NOx concentration and engine speed fluctuation coefficient, respectively, obtained when split injection and one-time injection were conducted;

DETAILED DESCRIPTION OF THE PREFERRED EMBODIMENTS OF THE INVENTION

A direct injection engine and its control device according to a preferred embodiment of the invention is now described referring to the accompanying drawings.

Figure 1:
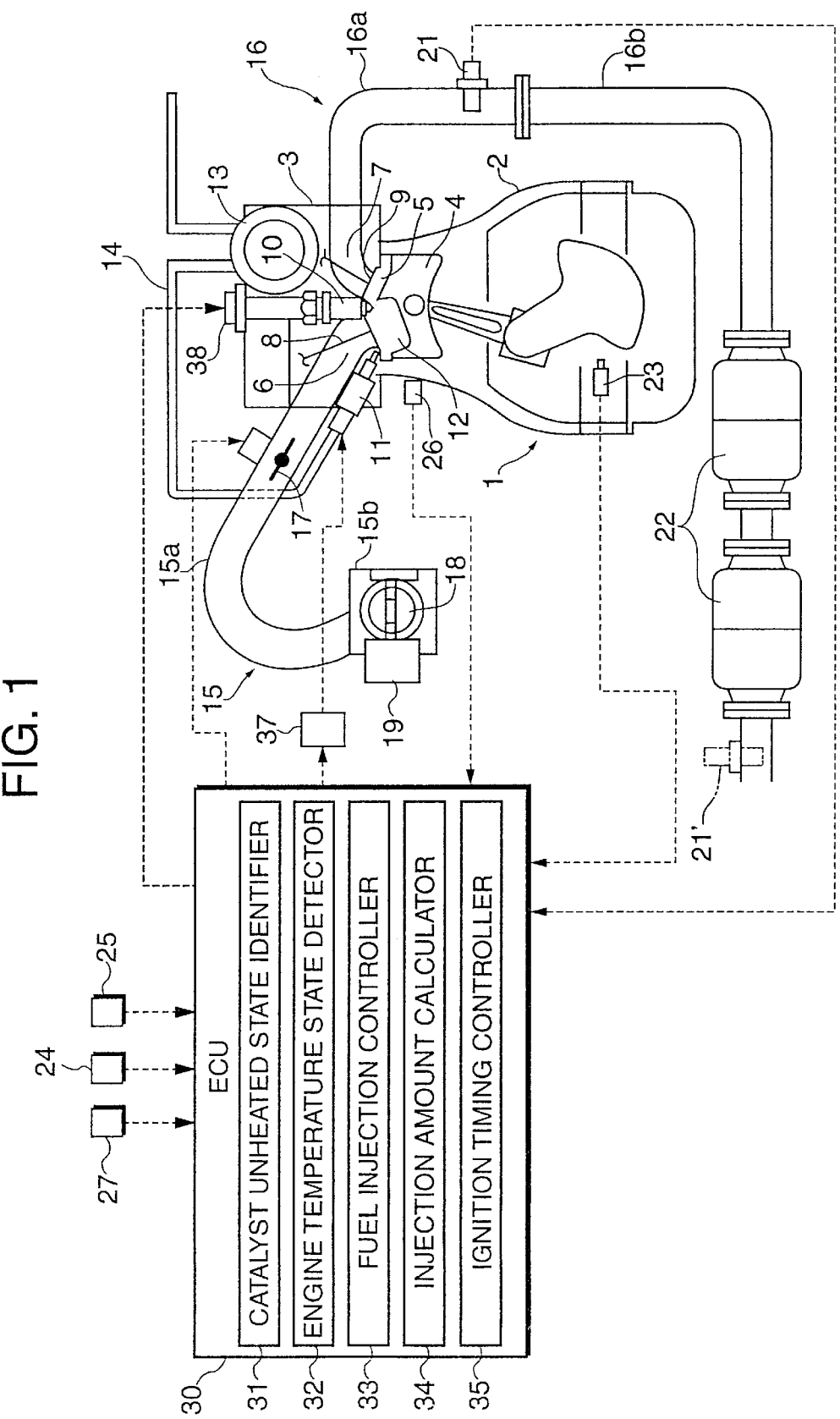
FIG. 1 is a general configuration diagram of a direct injection engine according to a preferred embodiment of the invention.

FIG. 1 shows a practical example of the direct injection engine. In this Figure, designated by the numeral 1 is a main engine body which includes a cylinder block 2 and a cylinder head 3 in which a plurality of cylinders are formed. A piston 4 is fitted in each cylinder and a combustion chamber 5 is formed between the top surface of the piston 4 and the bottom surface of the cylinder head 3.

A recess having a particular shape is formed in the bottom surface of the cylinder head 3, the recess forming an upper interior surface of the combustion chamber 5. For example, the upper interior surface of the combustion chamber 5 is formed into a pent-roof shape as illustrated, and intake ports 6 and exhaust ports 7 opening into the combustion chamber 5 are formed in its upper interior surface. Although one each intake port 6 and exhaust port 7 are shown in the FIG. 1, two each intake ports 6 and exhaust ports 7, individually arranged in a direction perpendicular to the page of the Figure, are provided in a preferred form. Then, an intake valve 8 and an exhaust valve 9 are provided in each intake port 6 and exhaust port 7, respectively. Driven by an unillustrated valve actuator, the intake valves 8 and the exhaust valves 9 are caused to open and close with specified timing.

Spark plugs 10 are fitted in the cylinder head 3 in such a way that each spark plug 10 is located approximately at the middle of the combustion chamber 5 with its spark gap located in the inner space of the combustion chamber 5.

An injector 11 which injects fuel directly into the combustion chamber 5 is provided at a peripheral part of the combustion chamber 5. In the embodiment shown in FIG. 1, the injector 11 is attached to the cylinder head 3 at the side of the combustion chamber 5 near the intake port 6, and the injector 11 is disposed such that it injects the fuel obliquely downward with the far end of the injector 11 located in the inner space of the combustion chamber 5.

Also in the illustrated embodiment, a cavity 12 having a U-shaped cross section is formed in the top of the piston 4 which constitutes the bottom side of the combustion chamber 5. The location and direction of the injector 11, the location of the cavity 12 and the location of the spark plug 10 is predetermined to satisfy a particular relationship in such a way that when the fuel is injected in the latter half of each compression stroke where the piston 4 approaches its top dead center, then the fuel is directed toward the cavity 12, bounced by the cavity 12 and eventually reaches the vicinity of the spark plug 10.

A high-pressure pump 13 is connected to the aforementioned injector 11 through a fuel-feeding passage 14. The high-pressure pump 13 and a high-pressure regulator which is disposed in an unillustrated return passage jointly adjust fuel pressure exerted on the injector 11 to such a high pressure level that is sufficient to enable fuel injection in a middle portion of the compression stroke or later.

An intake passage 15 and an exhaust gas passage 16 are connected to the aforementioned main engine body 1. The intake passage 15 branches out downstream of a surge tank 15b to the individual cylinders, whereby two branched passages 15a (of which only one is shown in FIG. 1) running parallel to each other are formed for each cylinder. The two intake ports 6 at the downstream ends of the branched passages 15a open into the combustion chamber 5, and a swirl control valve 17 for enhancing turbulence within the combustion chamber 5 is provided in one of these branched passages 15a. When the swirl control valve 17 is closed, a swirl is produced in the combustion chamber 5 by intake air inducted through the other branched passage 15a so that the turbulence within the combustion chamber 5 is enhanced.

As an alternative means for enhancing turbulence within the combustion chamber 5, a valve which produces a tumble may be provided in one branched passage instead of the swirl control valve 17, or there may be made such an arrangement that a squish is produced between the top surface of the piston and the upper interior surface of the combustion chamber (bottom surface of the cylinder head) near the top dead center in the compression stroke.

Further, a throttle valve 18 is provided halfway in the intake passage 15 and this throttle valve 18 is made controllable by an electrically driven actuator 19 like a stepper motor to permit control of the amount of intake air.

An exhaust gas recirculation (EGR) passage (not shown) is connected to the surge tank 15b via an EGR valve (not shown) to make it possible to introduce EGR gas upon completion of engine warm-up.

On the other hand, an oxygen ($O_2$) sensor 21 and a catalytic converter 22 containing a catalyst for converting exhaust gases are provided in the exhaust gas passage 16. The $O_2$ sensor 21 detects the air-fuel ratio of a mixture in the combustion chamber 5 by measuring the concentration of oxygen in the exhaust gases and is made of a sensor ($\lambda O_2$ sensor) whose output varies at the stoichiometric air-fuel ratio.

While the catalytic converter 22 may be formed of a three-way catalyst, it is desirable to use a catalyst capable of reducing NOx even in a lean mixture having a higher air-fuel ratio than the stoichiometric air-fuel ratio in order to provide increased emission converting performance when performing stratified charge combustion of a lean mixture whose air-fuel ratio has been increased after warm-up operation, as will be described later. More specifically, while the three-way catalyst exhibits high converting performance against all three pollutants HC, CO and NOx only in the vicinity of the stoichiometric air-fuel ratio as is commonly known, there exists a catalyst (lean NOx catalyst) which not only performs the same function as the three-way catalyst but also reduces NOx even in a lean mixture having a higher air-fuel ratio than the stoichiometric air-fuel ratio. Thus, it is preferable to reduce NOx by using this catalyst under lean operating conditions. It is to be noted, however, that this kind of lean NOx catalyst also exhibits its maximum converting performance in the vicinity of the stoichiometric air-fuel ratio.

Since the catalytic converter 22 contains the lean NOx catalyst, the catalyst temperature is likely to increase excessively under high-speed, high-load conditions if the catalytic converter 22 is provided immediately downstream of an exhaust manifold 16a (or directly connected to it). Therefore, the catalytic converter 22 is connected directly to an exhaust pipe 16b which is connected to the exhaust manifold 16a so that the catalytic converter 22 is situated farther away from the main engine body 1 than the position immediately downstream of the exhaust manifold 16a. In a case where the three-way catalyst is used, however, the catalytic converter 22 may be connected directly to the exhaust manifold 16a because the three-way catalyst has heat-resistant properties.

Designated by the numeral 30 in FIG. 1 is an electronic control unit (ECU) which performs engine control. The ECU 30 receives signals from various sensing devices, such as a crank angle sensor 23 for detecting the crank angle of the engine, an acceleration sensor 24 which detects accelerator opening (i.e., the amount of operation of an accelerator pedal), an airflow meter 25 for detecting the amount of intake air, a water temperature sensor 26 for detecting the temperature of engine cooling water, a starter switch 27 for activating a self-starter, and the aforementioned $O_2$ sensor 21.

The ECU 30 includes an identifier 31 for judging whether the catalyst is in its unheated state, an engine temperature state detector 32, a fuel injection controller 33, an injection amount calculator 34 and an ignition timing controller 35.

The aforementioned identifier 31 is provided for judging whether the catalyst is in its unheated state, in which the temperature of the catalyst is lower than its activation temperature. For example, the identifier 31 counts the time elapsed from the point of engine startup and judges that the catalyst is still in its unheated state if the elapsed time is smaller than a set period of time. This set time period is made approximately equal to but not smaller than the time required for the catalyst to reach its activation temperature. Preferably, the set time period is made larger than the time required for the catalyst to reach its activation temperature by a small amount (e.g., about 20 seconds). If the waiting time for making a judgment on the catalyst state is set slightly longer than the time required for the catalyst to reach its activation temperature, the ECU 30 can properly control the engine, performing the catalyst quick light-off operation during this time period. As will be described later in greater detail, the catalyst will certainly reach a temperature within its activation temperature range when the set time period has elapsed. Thereafter, the catalyst will be maintained within the activation temperature range even when the amount of injected fuel is reduced and the catalyst temperature drops to a certain extent due to lean operating conditions or deceleration, for instance.

The aforementioned engine temperature state detector 32 senses the temperature state of the engine based on a parameter related to the engine temperature, such as the temperature of the engine cooling water detected by the water temperature sensor 26.

The aforementioned fuel injection controller 33 is for controlling fuel injection timing and the amount of fuel to be injected from the injector 11 through an injector driving circuit 37. When the catalyst is in its unheated state, the fuel injection controller 33 controls the injector 11 to make split injection including at least two injection cycles during a period from an intake stroke to an ignition point at least in a low-load operating range of the engine, the two injection cycles including later injection performed in the middle portion of the compression stroke or later and earlier injection performed prior to the later injection.

Here, the middle portion of the compression stroke refers to an intermediate part of the compression stroke as it is divided in three equal portions, that is, the earlier, middle and later portions. Accordingly, the middle portion of the compression stroke means the period from the point of 120° before the top dead center (BTDC) to the point of 60° BTDC in terms of the crank angle. Thus, the later injection cycle is caused to occur at the point of 120° BTDC or later. It is however desirable to begin the later injection cycle before three-fourths of the period of the compression stroke elapses (not later than 45° BTDC), because combustion stability is impaired if the later injection timing is too late as will be later discussed.

Further, the timing of at least one of the injection cycles in split injection mode is varied according to the engine temperature status while the catalyst is in its unheated state. In this embodiment, the later injection timing is varied according to the engine temperature status. Specifically, the later injection timing is retarded when the engine temperature becomes higher than a specified temperature.

Injection timing (injection starting points) of the aforementioned earlier injection and later injection is discussed in detail referring to FIG. 2. A basic injection point θadb for the later injection cycle is set to occur during the middle portion of the compression stroke or later, or within a period from about 120° BTDC to about 45° BTDC in the compression stroke, for example. When the catalyst is in its unheated state and the engine is cold, an actual later injection point θad is set to the basic later injection point θadb, and an earlier injection point θak is set to occur within an appropriate period preceding the later injection cycle, e.g., during the period of the intake stroke. When the engine temperature has exceeded the specified temperature (e.g., 40° C.) while the catalyst is not heated yet, the later injection point θad is retarded from the basic later injection point θadb by a correction value θk.

In such split injection mode performed when the catalyst is in its unheated state, the amount of intake air is adjusted by controlling throttle opening which corresponds to the accelerator opening, for instance, while the air-fuel ratio is set to fall within a range of 13 to 17, in which high heat release efficiency is achieved. According to the air-fuel ratio and the amount of intake air thus determined, the aforementioned injection amount calculator 34 calculates the amount of fuel to be injected and the fuel injection controller 33 divides the total amount of fuel into two portions by a specified dividing ratio to thereby control the amounts of fuel to be injected in the earlier and later injection cycles.

In the above operation, either of the aforementioned earlier injection and later injection cycles is so controlled as to inject fuel which will contribute to main combustion which occurs within a main combustion period. Generally, in a combustion process occurring within a combustion chamber 5, a period in which up to about 10% by mass of the injected fuel is burnt is called an initial combustion period and a period in which from about 10% to 90% by mass of the injected fuel is burnt is called the main combustion period. As will be explained later again, initial combustion in which the fuel injected by later injection is ignited and burnt is a combustion cycle encompassing the initial combustion period and an earlier part of the main combustion period. The amounts of fuel injected in the individual injection cycles are set in such a way that the fuel injected by earlier injection creates a mixture having an air-fuel ratio capable of flame propagation by combustion of the fuel injected by later injection within the combustion chamber 5 so that both proportions of fuel injected by the earlier injection and later injection contribute to the main combustion, and the lean mixture produced from the fuel injected by the earlier injection is slowly burnt.

Specifically, the proportions of the injected fuel are set such that the air-fuel ratio within the combustion chamber 5 obtained by the earlier injection only becomes 85 or less to achieve an air-fuel ratio capable of flame propagation from a flame caused by combustion of the fuel injected by the later injection and, thus, the proportion of fuel injected by the earlier injection is made equal to ⅕ or more (or the proportion of fuel injected by the later injection is ⅘ or less) of the total amount of the injected fuel. For example, if the air-fuel ratio within the entire combustion chamber 5 is 17 and the air-fuel ratio within the combustion chamber 5 to be achieved by the earlier injection only is 85, the proportion of fuel to be injected by the earlier injection is ⅕.

Also, the proportion of fuel injected by the later injection is made equal to ⅕ or more (i.e., the proportion of fuel injected by the earlier injection is ⅘ or less) of the total amount of the injected fuel. Thus, the proportion of fuel injected by the earlier injection falls within a range of ⅕ to ⅘. Preferably, the amount of fuel injected by the earlier injection is set such that the air-fuel ratio within the combustion chamber 5 obtained by the earlier injection alone becomes equal to or higher than the flammability limit air-fuel ratio (i.e., a limit of air-fuel ratio at which a mixture can burn by itself: approximately 30) within the aforementioned range.

The aforementioned ignition timing controller 35 outputs a control signal to an ignition device 38 and thereby controls the ignition timing according to operating conditions of the engine. Although the ignition timing is essentially controlled to achieve a minimum spark advance for best torque (MBT), it is retarded from the MBT by a specified amount when the catalyst is in its unheated state.

The ECU 30 including the aforementioned individual means also is so constructed as to control the amount of intake air as well by outputting a control signal to the actuator 19 for driving the throttle valve 18. Specifically, the ECU 30 controls the opening of the throttle valve 18 according to the accelerator opening when the engine is operated at the stoichiometric air-fuel ratio in a high-load range, for instance, when the catalyst is in its unheated state or has already been heated, whereas the ECU 30 controls the throttle valve 18 to open to increase the amount of intake air and thereby increase the air-fuel ratio when stratified charge combustion is made by injecting the fuel solely in the compression stroke in a low-load range, for instance, after warm-up. Further, the ECU 30 controls the aforementioned swirl control valve 17 to produce a swirl within the combustion chamber 5 during split injection, for instance.

Figure 3A:
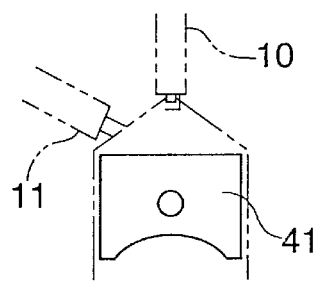
FIGS. 3A to 3C are diagrams showing variations of pistons for the direct injection engine.

The engine depicted in FIG. 1 is constructed such that with the provision of the stratified charge-forming cavity 12 formed in the top of the piston 4 for capturing the fuel injected from the injector 11 and redirecting it toward the spark plug 10, a stratified charge state in which a relatively rich mixture is locally distributed in the vicinity of the spark plug 10 is obtained when fuel injection from the injector 11 is made in the middle portion of the compression stroke or later. The device of this invention, however, is applicable not only to the aforementioned type of engine (hereinafter referred to as the stratified charge engine) but also to a direct injection engine which does not necessarily stratify the mixture (hereinafter referred to as the non-stratified charge engine) with the provision of pistons 41, 42 or 43 shown in FIGS. 3A–3C, for example.

Figure 3B:
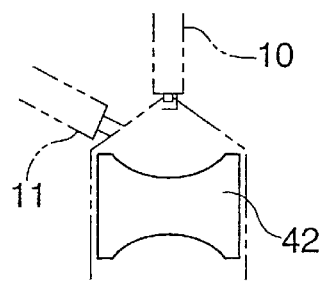
Figure 3C:
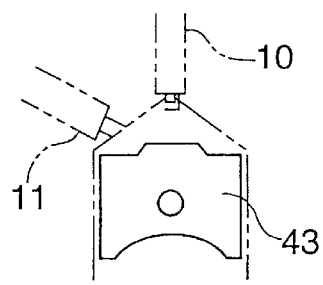

In this Specification, a "flat piston" refers to a piston which is not provided with the aforementioned cavity 12 for stratified charge formation. Thus, flat pistons are not limited to those having a completely flat top like the one shown in FIG. 3A but include those having a recessed or protruding top surface to obtain a combustion chamber shape to meet requirements as shown in FIGS. 3B and 3C as long as such recessed or protruding top shape is not intended for stratified charge formation.

Figure 4:
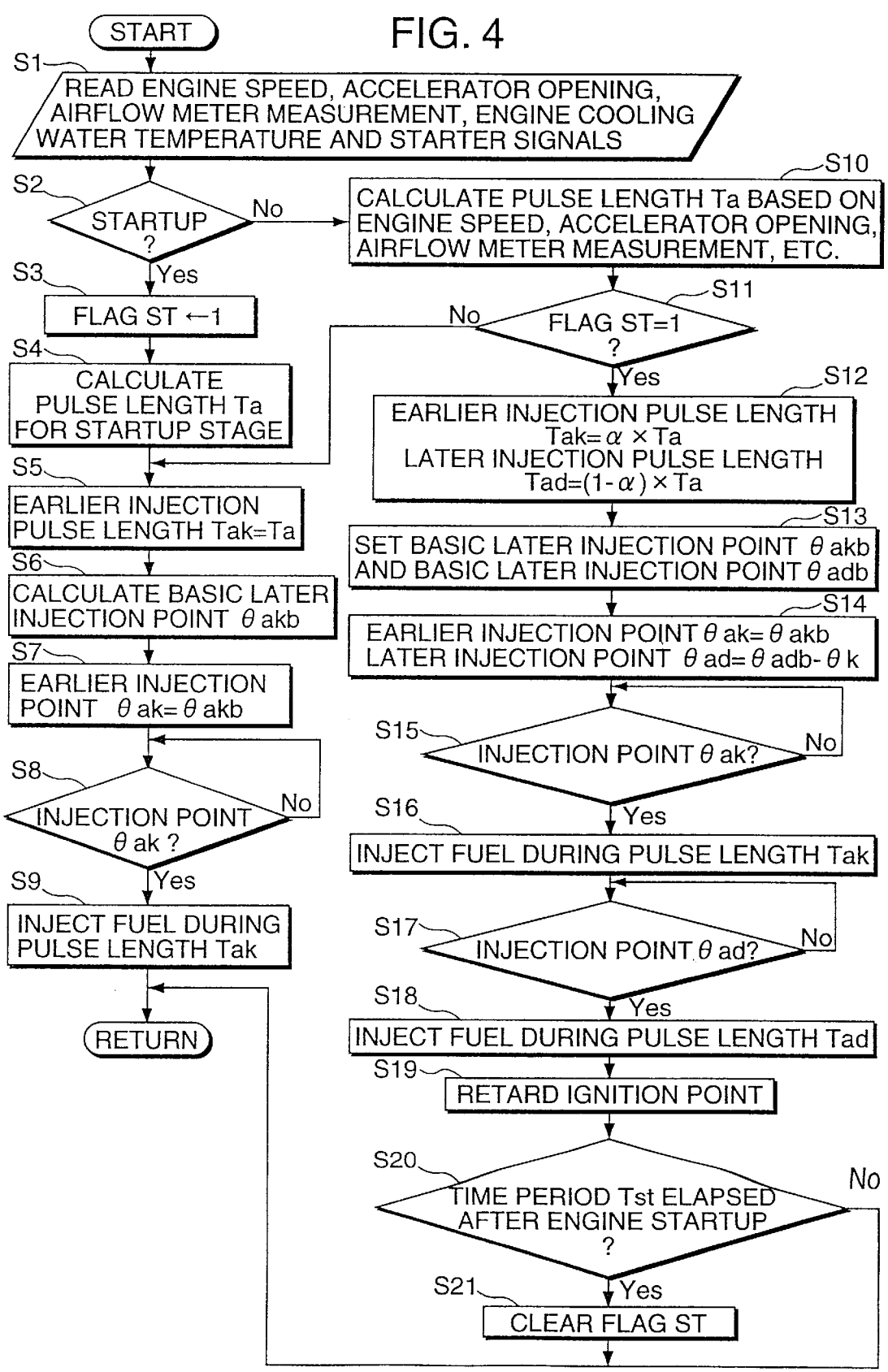
FIG. 4 is a flowchart showing an example of a routine for controlling fuel injection and other operation in the direct injection engine.
Figure 5:
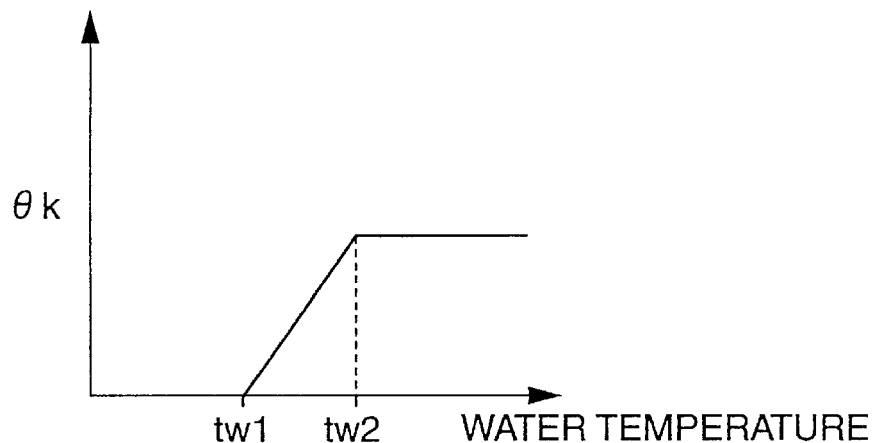
FIG. 5 is a diagram showing the relationship between cooling water temperature and a later injection point correction value.

An example of control operation of this direct injection engine is now described referring to the flowchart of FIG. 4.

When a routine shown in FIG. 4 is commenced, engine speed, accelerator opening, airflow meter measurement, engine cooling water temperature and starter signals are entered to the ECU 30 in step S1. Then, a judgment is made in step S2 to determine whether the engine is in its startup stage based on the starter signal and engine speed.

If the engine is judged to be in the startup stage in step S2, a flag ST is set to "1" in step S3 and an injection pulse length Ta which determines the amount of fuel to be injected in the startup stage is calculated in step S4 based on the engine cooling water temperature, for instance. This pulse length Ta is set directly as a pulse length Tak for the earlier injection cycle (intake stroke injection) in step S5. Further, a basic injection point θakb for the earlier injection cycle is calculated in step S6 and it is set directly as the earlier injection point θak in step S7. Fuel injection is made by outputting an injection pulse having the aforementioned pulse length Tak when the earlier injection point θak is reached (steps S8, S9).

If the engine is judged not to be in the startup stage in step S2, an injection pulse length Ta which determines the amount of fuel to be injected is calculated in step S10 based on the engine speed, accelerator opening, airflow meter measurement, etc. In this case, the air-fuel ratio within the entire combustion chamber 5 is set to fall within a range of 13 to 17 with the amount of intake air adjusted to match a required torque level by controlling the throttle opening based on the engine speed, accelerator opening, etc., and the amount of fuel to be injected (pulse length Ta) is calculated according to the set air-fuel ratio, airflow meter measurement, etc. at least when the catalyst is in its unheated state.

While the amount of fuel to be injected is calculated by open-loop control until the $O_2$ sensor 21 is activated, it is calculated by feedback control based on the output of the $O_2$ sensor 21 when the $O_2$ sensor 21 has been activated. This means that the amount of fuel to be injected can be obtained adding a feedback correction value corresponding to the output of the $O_2$ sensor 21 to a basic injection amount after activation of the $O_2$ sensor 21. The amount of fuel to be injected can be obtained with high precision in this way.

In step S11 following step S10, a judgment is made to determine whether the flag ST is set to "1". As will be described later, this flag ST is cleared when a preset period of time Tst has elapsed after engine startup. Therefore, if the value of the flag ST is "1", it means that the preset period of time has not elapsed yet after engine startup and the catalyst is supposed to be in its unheated state.

When the catalyst has been judged to be still in its unheated state (i.e., the value of the flag ST is "1"), operation from step S12 onward is carried out to cause the injector 11 to make split injection.

More particularly, in control operation performed when the catalyst is in its unheated state, the earlier injection pulse length Tak and later injection pulse length Tad are calculated in step S12 as follows:

Tak=αXTa

Tad=(1−α)XTa where α is the earlier injection fuel ratio (i.e., the proportion of fuel injected by the earlier injection in relation to the total amount of injected fuel) which is set within a range of ⅕ to ⅘ according to the engine operating conditions.

In step S13, the basic later injection point θakb and basic later injection point θadb are determined such that the earlier injection is made during the period of the intake stroke and the later injection is made during an appropriate period within the middle portion of the compression stroke or later. Further in step S14, the basic later injection point θakb is set directly as the earlier injection point θak while the later injection point θad is set to a value obtained by reducing the correction value θk corresponding to the cooling water temperature from the basic later injection point θadb.

Figure 2:
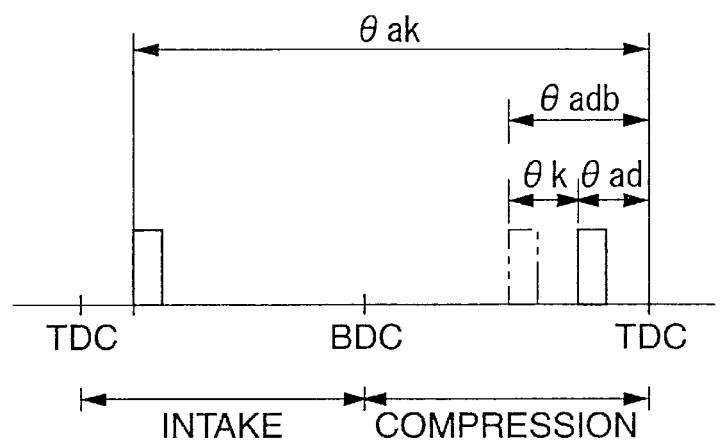
FIG. 2 is a diagram showing the timing of earlier and later injection cycles in split injection mode.

Here, the individual injection points (θakb, θadb, etc.) are expressed by the crank angle in terms of degrees before the top dead center (BTDC) on the compression stroke as shown in FIG. 2, so that the smaller the value of the injection point, the more retarded is the injection timing. The aforementioned correction value θk is set to 0 when the cooling water temperature is equal to a lower than a first set temperature tw1 (about 45° C., for example), increases as the cooling water temperature increases up to a second set temperature tw2 (about 60° C., for example) which is higher than the first set temperature tw1 by a certain amount, and is set to a specified maximum value when the cooling water temperature is equal to or higher than the second set temperature tw2. This means that the later injection point θad is made equal to the basic later injection point θadb when the cooling water temperature is equal to a lower than a first set temperature tw1, or when the engine is cold, the later injection point θad is gradually retarded as the cooling water temperature increases beyond the first set temperature tw1, and the later injection point θad is retarded by a maximum amount when the engine has been completely heated and the cooling water temperature becomes equal to or higher than the second set temperature tw2.

Fuel injection is made during a period determined by the earlier injection pulse length Tak when the aforementioned earlier injection point θak is reached (steps S15, S16). Subsequently, when the later injection point θad is reached, fuel injection is made again during a period determined by the later injection pulse length Tad (steps S17, S18). Further, when the catalyst is in its unheated state, the ignition timing controller 35 performs control operation for retarding the ignition point in step S19.

Step S20 judges whether the preset time period Tst has elapsed after engine startUp. The time period Tst is made equal to or more or less longer than the time required for the catalyst to reach its heated state. When this time period Tst has not elapsed yet (No in step S20), the operation flow is returned to the beginning of the routine and the above-described steps S1, S2, S10 through S19 are reexecuted.

When the time period Tst has already elapsed (Yes in step S20), the flag ST is cleared in step S21 and, then, the operation flow is returned to the beginning of the routine. Since the value of the flag ST is now judged not to be "1" ordinary control operation applicable when both the catalyst and the engine have been fully heated is carried out thereafter. In the earlier-mentioned non-stratified charge engine, for example, one-time injection is made in the intake stroke (intake stroke one-time injection) according to step S5 onward. In the earlier-mentioned stratified charge engine, control operation after the catalyst and the engine have reached their heated state may be such that fuel injection mode and air-fuel ratio, for instance, are controlled according to the engine operating conditions in the following fashion. Specifically, in a low-speed, low-load range, for example, fuel injection is made in the compression stroke (compression stroke injection) to conduct stratified charge combustion and the air-fuel ratio is increased to produce a leaner mixture. Also, if the engine is in a high-speed range or a high-load range, it is switched to intake stroke injection to conduct uniform combustion. Furthermore, in a region between a stratified charge combustion region and a uniform combustion region in a medium-load range, split injection is made encompassing the intake and compression strokes as required to prevent a sudden change in torque.

Operational features of the above-described direct injection engine of the present embodiment are described in the following.

If the catalyst is in its unheated state upon engine startup, fuel injection from the injector is made in two separate cycles, that is, the earlier injection made during the intake stroke and the later injection made in the middle portion of the compression stroke or later while controlling the amount of intake air and the amount of fuel to be injected so that the air-fuel ratio within the entire combustion chamber 5 falls within the range of 13 to 17.

The fuel injected by the earlier injection spreads throughout the entire combustion chamber 5 and creates a mixture layer which is lean but capable of flame propagation, because a sufficient time is available for evaporation, atomization and spreading prior to ignition. The fuel injected by the later injection causes a locally relatively rich mixture to exist at least in the vicinity of the spark plug 10. More specifically, in the stratified charge engine shown in FIG. 1, the fuel injected by the later injection is caused to gather at a high concentration around the spark plug 10 and, as a consequence, a stratified charge state in which a mixture layer having an air-fuel ratio equal to or lower than the stoichiometric air-fuel ratio is formed is obtained. Also in non-stratified charge engine employing the flat pistons as shown in FIG. 3, the later injection, from which a relatively short time is left until the ignition point, produces a mixture having local unevenness in the combustion chamber 5 and a condition in which mixture masses locally richer than other portions are scattered in the combustion chamber 5 is created, so that these rich mixture masses exist near the spark plug 10 as well.

As such fuel supply conditions are created, ignition and combustion of the mixture are made in a desirable fashion, HC and NOx in the exhaust gases released from the engine are reduced, resulting in an improvement in emissions while the catalyst is in its unheated state, and the exhaust gas temperature increases so that the catalyst quick light-off operation is performed.

The temperature status of the engine and that of the catalyst do not necessarily match each other. When the engine is restarted after it has once been stopped but not completely cooled down, for example, the engine may reach its heated condition, in which its temperature (cooling water temperature) is higher than the specified temperature, before the catalyst reaches its unheated state. In such a case, the later injection point is retarded as the engine temperature increases. In the case of hot engine restart, in which the engine temperature is already higher than the specified temperature at the point of engine startup, the later injection point is retarded immediately upon engine startup and this condition is maintained for a specified time period.

Since the engine is controlled according to its temperature status as described above, reduction of HC and NOx and the catalyst quick light-off operation are made even more effectively.

Furthermore, since the injection point is retarded while the catalyst is in its unheated state, HC and NOx reduction and catalyst quick light-off effects are further increased.

The aforementioned operational features and effects are specifically explained referring to FIGS. 6 to 13. Split injection referred to in FIGS. 6 to 13 means split injection in which earlier injection is made during the intake stroke and later injection is made during the compression stroke as explained in the foregoing embodiment.

Figure 6:
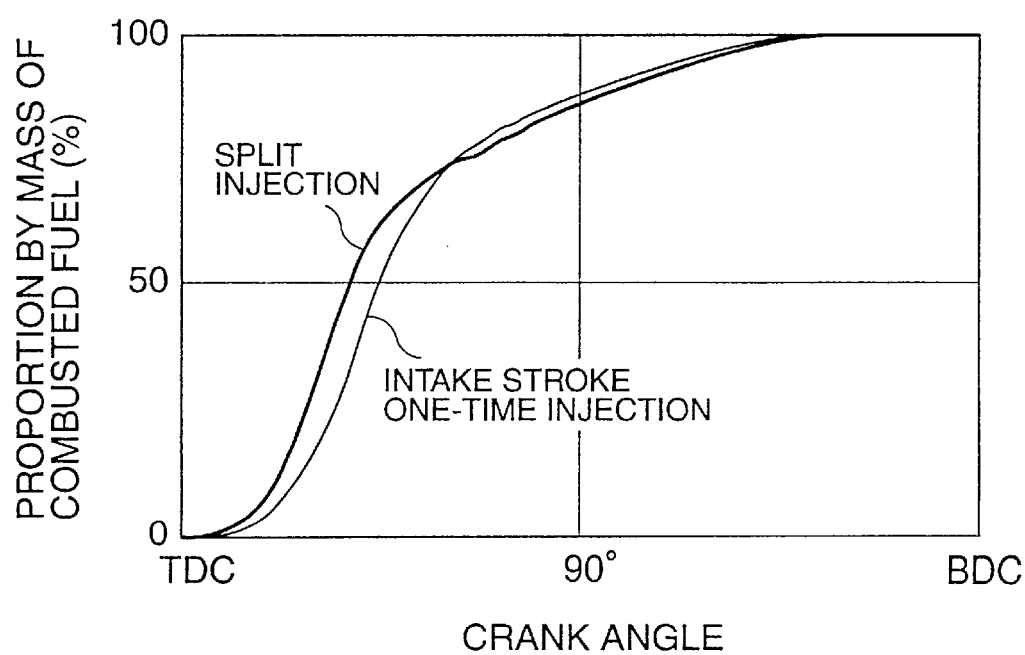
FIG. 6 is a diagram showing variations in the proportion by mass of combusted fuel observed when split injection was conducted and when one-time injection was conducted in an intake stroke.

FIG. 6 shows data on variations in the proportion by mass of combusted fuel after ignition examined when split injection was made and when intake stroke one-time injection (comparative example) was made under the following operating conditions:

| | |
|---|---|
| Engine speed: | 1500 rpm |
| Brake mean effective pressure (Pe): | 294 kPa |
| Ignition timing: | Retarded to top dead center (TDC) on compression stroke (in which MBT is about 10° BTDC.) |

As shown in this Figure, burning in a latter part of a combustion period is slower in the split injection than in the one-time injection of the aforementioned comparative example. This means that the split injection has greater effects in increasing the exhaust gas temperature. Since burning in the latter part of the combustion period is sufficiently done in this manner. The catalyst quick light-off operation is performed and HC and NOx are reduced. Reasons why such phenomenon occurs are supposed to be as follows.

Specifically, because the locally relatively rich mixture exists at least in the vicinity of the spark plug 10 due to the later injection made in the middle portion of the compression stroke or later as described earlier, ignition stability is ensured and combustion after ignition is properly made. On the other hand, the fuel injected by the earlier injection spreads throughout the entire combustion chamber 5 and creates a lean mixture therein, and as burning of the mixture produced by the later injection proceeds, a flame propagates to the lean mixture which was produced by the fuel injected by the earlier injection and mixed with part of the fuel injected by the later injection, whereby the lean mixture mass is burnt.

To summarize, burning of the mixture produced by the later injection and succeeding burning of the lean mixture produced mainly by the fuel injected by the earlier injection are made during the main combustion period. Since the burning of the lean mixture is a slow combustion process, it serves to suppress generation of NOx. It is thus supposed that the quick light-off operation is performed with an increase in the exhaust gas temperature and HC is oxidized and decreased.

Referring again to FIG. 6, the proportion by mass of combusted fuel in an earlier part of combustion rises more quickly in the split injection than in the intake stroke one-time injection, and this indicates that the combustion stability is high. Such phenomenon is conspicuously observed in the stratified charge engine shown in FIG. 1, as well as in the non-stratified charge engine employing the flat pistons shown in FIG. 3 by performing the split injection mode. Reasons why such phenomenon occurs are supposed to be as follows.

Since the time period from the later injection to ignition is so short in the stratified charge engine that the mixture produced by the fuel injected by the later injection is locally distributed around the spark plug 10 and there is unevenness in the distribution of the air-fuel ratio even within the locally distributed region. Therefore, the flame propagation velocity becomes uneven and irregular recesses and protrusions are formed in a flame front in the process of flame propagation. It is supposed that burning in the earlier part of combustion is prompted because the aforementioned unevenness of the flame front increases its surface area and contributes to prompting of combustion. Also in the non-stratified charge engine, a condition in which relatively rich mixture masses and lean mixture masses are randomly scattered is created by the later injection and, therefore, the flame propagation velocity becomes uneven and irregular recesses and protrusions are formed in the flame front in the process of flame propagation. It is supposed that burning in the earlier part of combustion is prompted because the aforementioned unevenness of the flame front increases its surface area and contributes to prompting of combustion, As it becomes possible to increase the amount of ignition timing retardation when the combustion stability is enhanced as described above, it is possible to further increase the exhaust gas temperature increasing effects and HC and NOx reduction effects due to retardation of the ignition timing in addition to the earlier-mentioned effects of increasing the exhaust gas temperature by the slowing of combustion in the latter part of the combustion period.

Figure 7:
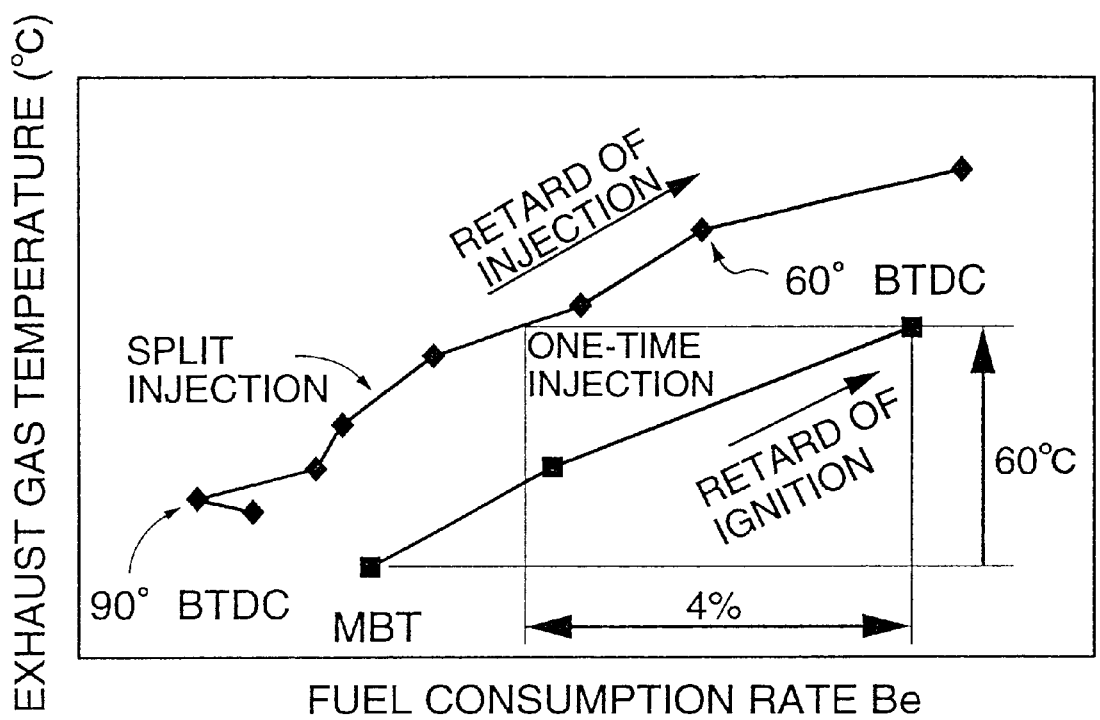
FIG. 7 is a diagram showing exhaust gas temperature and fuel economy rate observed when the later injection point was altered in various ways in split injection and when the amount of ignition point retardation was altered in various ways in one-time injection.

FIG. 7 shows variations in fuel economy rate and exhaust gas temperature observed when the ignition point is varied from the point of MBT to a retarding side in intake stroke one-time injection and when the later injection timing is varied with the ignition point set to the point of MBT in split injection. Operating conditions used were an engine speed of 1500 rpm and a brake mean effective pressure (Pe) of 294 kPa. As can be seen from this Figure, the exhaust gas temperature increases and the fuel economy rate deteriorates as the injection point is progressively retarded in the case of intake stroke one-time injection. On the other hand, the exhaust gas temperature increases and the fuel economy rate deteriorates as the later injection point is progressively retarded from about 90° BTDC (before the top dead center) on the compression stroke in the case of split injection.

A comparison of these cases indicates thdt the fuel economy rate deteriorates in split injection compared to intake stroke one-time injection at same the exhaust gas temperature (e.g., when the exhaust gas temperature is increased by 60° C. with the injection timing retarded from the point of MBT in intake stroke one-time injection). In other words, the exhaust gas temperature can be more increased by retarding the ignition point in split injection than in one-time injection provided that the deterioration in fuel economy is kept approximately at the same level. Furthermore, it will be possible to increase the exhaust gas temperature to an even greater extent if the ignition point is retarded in the split injection mode.

FIGS. 8A–8D show measurement results of exhaust gas temperature, HC and NOx concentrations in exhaust gases released from the combustion chamber 5 and engine speed fluctuation coefficient ΔRPM (standard deviation) taken from a testing of a comparative example in which the ignition timing was retarded in intake stroke one-time injection and of the practical example of the invention in which the ignition timing was retarded in split injection, the testing being conducted with the amount of ignition timing retardation adjusted to equalize the amount of fuel consumption for the two examples (the ignition timing was retarded up to TDC in both the comparative example and the practical example) at an engine speed of 1500 rpm under low-load operating conditions. As can be seen from this Figure, the exhaust gas temperature is significantly more increased, the HC and NOx concentrations are more reduced and the engine speed fluctuation coefficient ARPM is more reduced in the practical example of this invention than in the comparative example even under the same operating conditions and at the same amount of fuel consumption.

Reasons for this are supposed to be that the exhaust gas temperature is increased and HC is reduced since burning in the latter part of combustion is slowed down by split injection as described earlier, NOx is reduced because burning of a lean mixture produced by earlier injection becomes a slow combustion process, for instance, the combustion stability is enhanced due to prompting of burning in the earlier part of the combustion period, and so forth.

Figure 9:
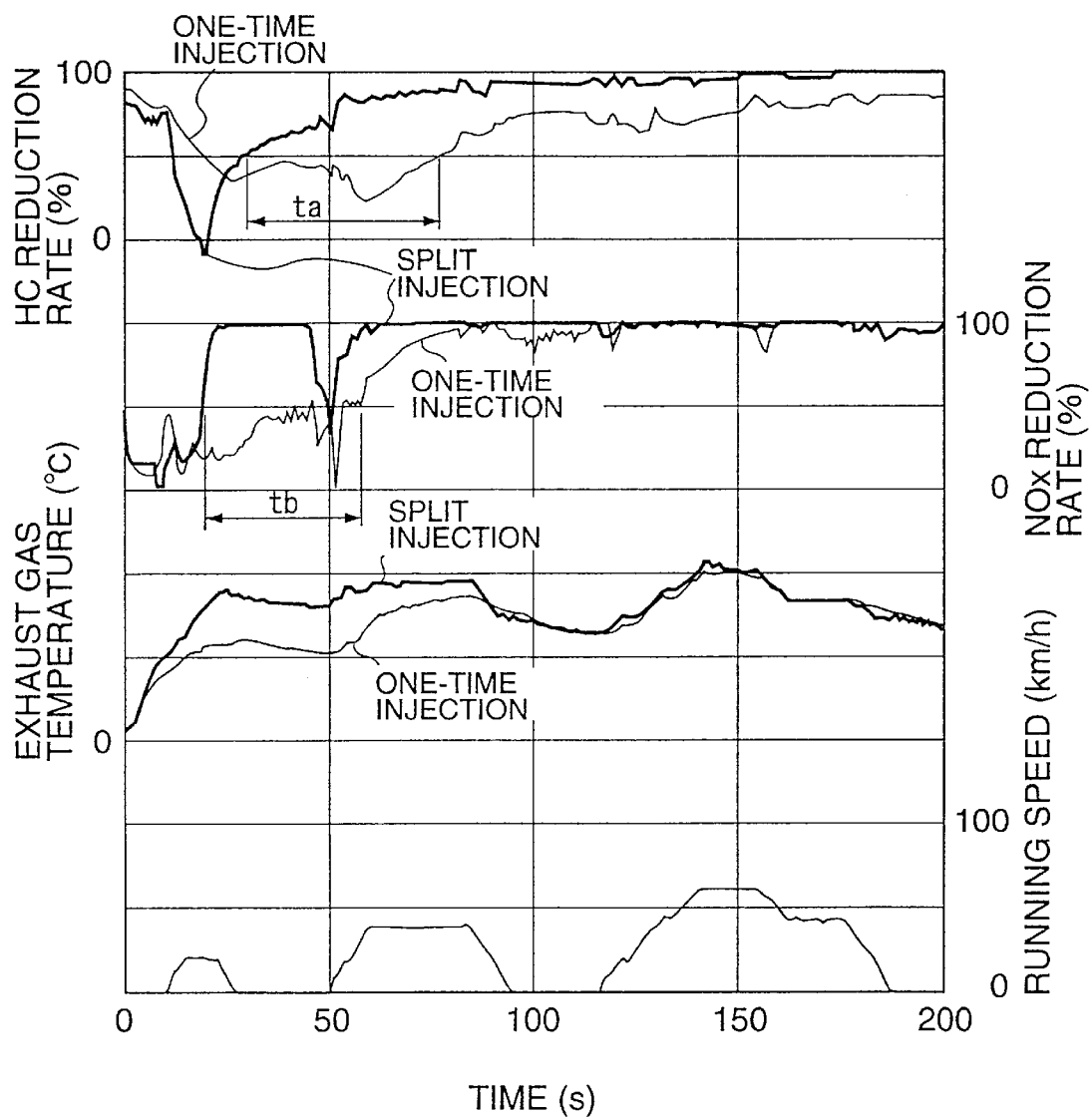
FIG. 9 is a diagram showing variations with time of HC reduction rate, NOx reduction rate, exhaust gas temperature and vehicle running speed on a vehicle-mounted engine.

FIG. 9 shows measurement results of HC reduction rate, NOx reduction rate and exhaust gas temperature taken when one-time injection was conducted in the intake stroke and when split injection was conducted while driving a motor vehicle equipped with the direct injection engine. As can be seen from this Figure, the increase in the exhaust gas temperature is prompted in the case of split injection compared to the case of intake stroke one-time injection and, as a consequence, periods of time individually required for the HC reduction rate and NOx reduction rate to reach 50% are significantly reduced (by ta and tb as illustrated, respectively).

Figure 10:
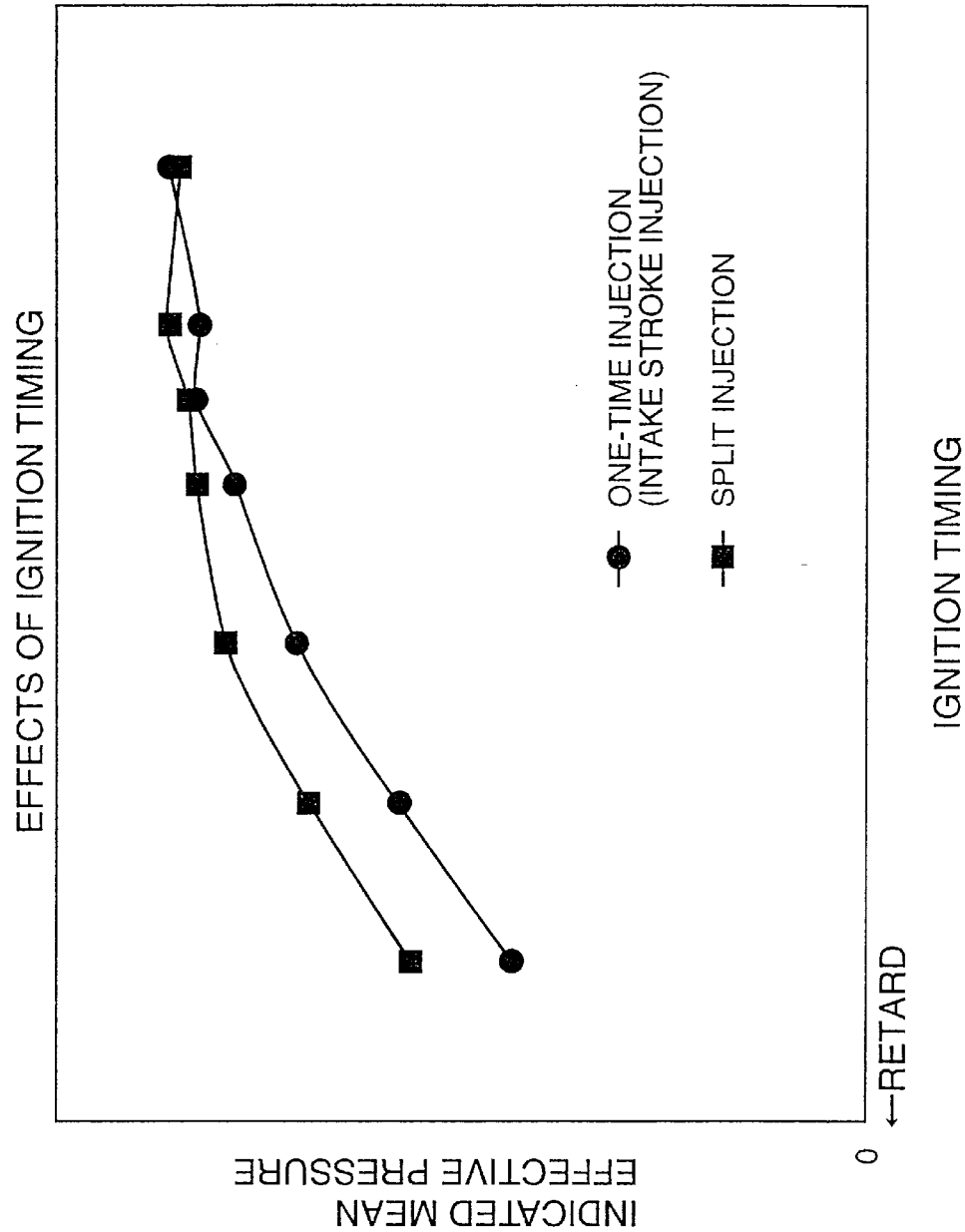
FIG. 10 is a diagram showing the relationship between the ignition timing and indicated mean effective pressure when intake stroke one-time injection was made and when split injection was made.

FIG. 10 shows data on the relationship between the ignition timing and indicated mean effective pressure examined when intake stroke one-time injection was made and when split injection was made. As can be seen from this Figure, although the indicated mean effective pressure (torque) decreases when the ignition timing is retarded, the degree of reduction in the indicated mean effective pressure is smaller in split injection than in intake stroke one-time injection.

It is recognized from the aforementioned data that HC and NOx in the exhaust gases released from the combustion chamber 5 are reduced, resulting in an improvement in emissions, and the catalyst quick light-off operation is performed as a result of an increase in the exhaust gas temperature by making split injection when the catalyst is in its unheated state as in the present invention. Moreover, the combustion stability and fuel economy are improved in this invention compared to the case in which the ignition timing is retarded by a large amount in one-time injection.

Figure 11:
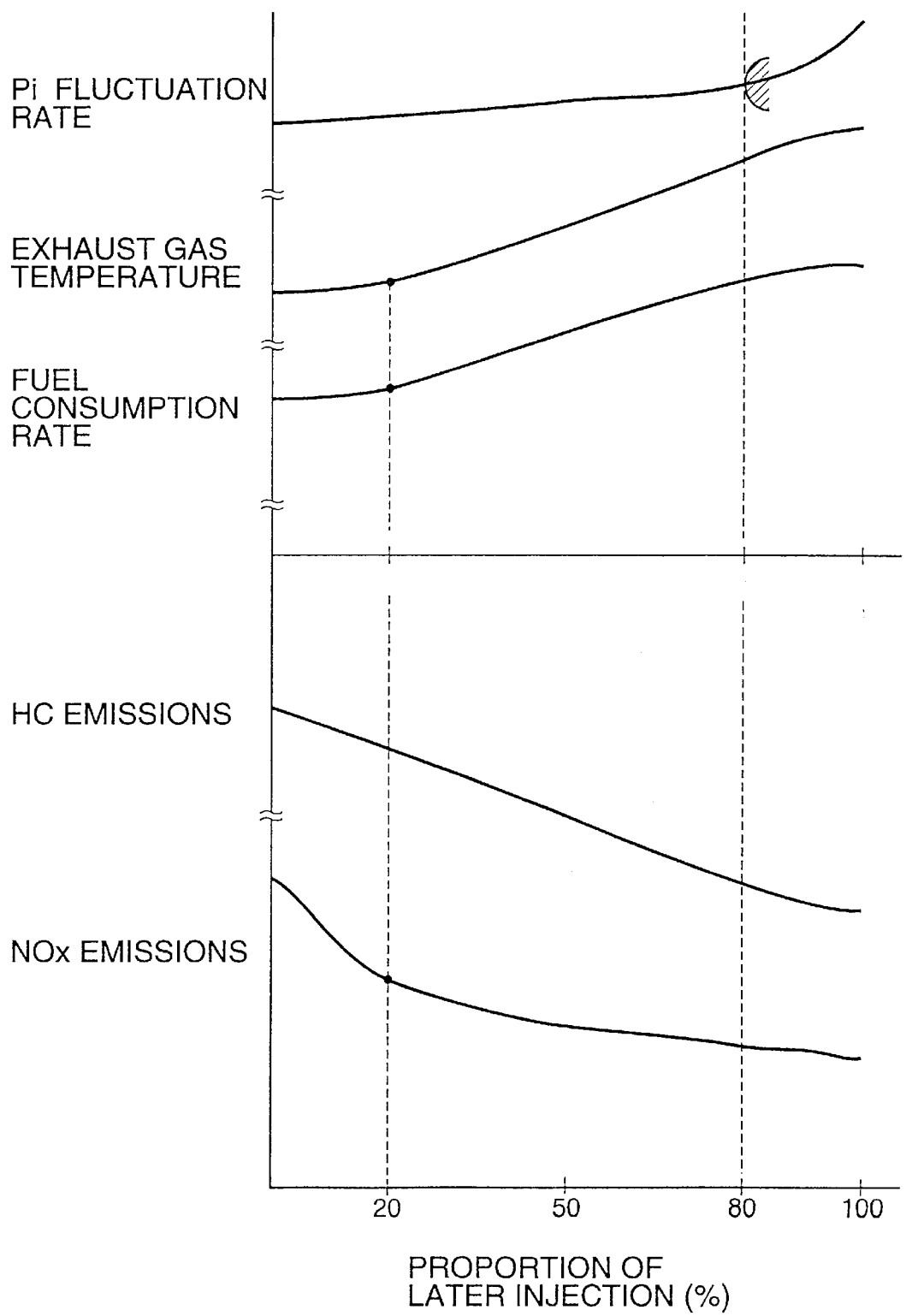
FIG. 11 is a diagram showing variations in Pi fluctuation rate and other parameters observed when the proportion of fuel to be injected by later injection is varied in various ways.

FIG. 11 shows data on the relationship among the proportion of fuel to be injected by the later injection (or the ratio of the amount of fuel injected by the later injection to the total amount of injected fuel) and Pi (indicated mean effective pressure) fluctuation rate, exhaust gas temperature, fuel economy rate, the amount of HC emissions and the amount of NOx emissions. Operating conditions used were an engine speed of 1500 rpm, a brake mean effective pressure (Pe) of 294 kPa and an engine cooling water temperature of 40.0° C., in which the ignition timing was retarded to the top dead center (TDC) on compression stroke. As can be seen from this Figure, exhaust gas temperature increasing effects and HC and NOx reduction effects are not sufficiently obtained if the proportion of fuel injected by the later injection is smaller than 20% (⅕). When the proportion of fuel injected by the later injection becomes equal to or larger than 20% (⅕), the exhaust gas temperature increasing effects and the HC and NOx reduction effects increase with an increase in the proportion of fuel injected by the later injection, but the Pi fluctuation rate and fuel economy rate gradually increase. When the proportion of fuel injected by the later injection exceeds 80%, the Pi fluctuation rate exceeds its permissible level and the combustion stability is lost.

Accordingly, it is desirable to keep the proportion of fuel injected by the later injection within a range of 20% to 80% (⅕ to ⅘), or to keep the proportion of fuel injected by the earlier injection within a range of ⅘ to ⅕, in order to maintain the combustion stability and torque while ensuring the exhaust gas temperature increasing effects and HC and NOx reduction effects when the catalyst is in its unheated state and the engine is cold. The exhaust gas temperature increasing effects and HC and NOx reduction effects become greater as the proportion of fuel injected by the later injection is increased, that is, as the proportion of fuel injected by the earlier injection is decreased, as long as these proportions fall within the aforementioned ranges. If the amount of fuel injected by the earlier injection is set to such a low level that the air-fuel ratio within the entire combustion chamber produced by only the earlier injection becomes equal to or higher than the flammability limit air-fuel ratio (approximately 30), the mixture created by the earlier injection becomes sufficiently lean. Since this lean mixture burns slowly, retarding the burning in the latter part of the combustion period, it is possible to obtain sufficient exhaust gas temperature increasing effects and HC and NOx reduction effects.

Figure 12:
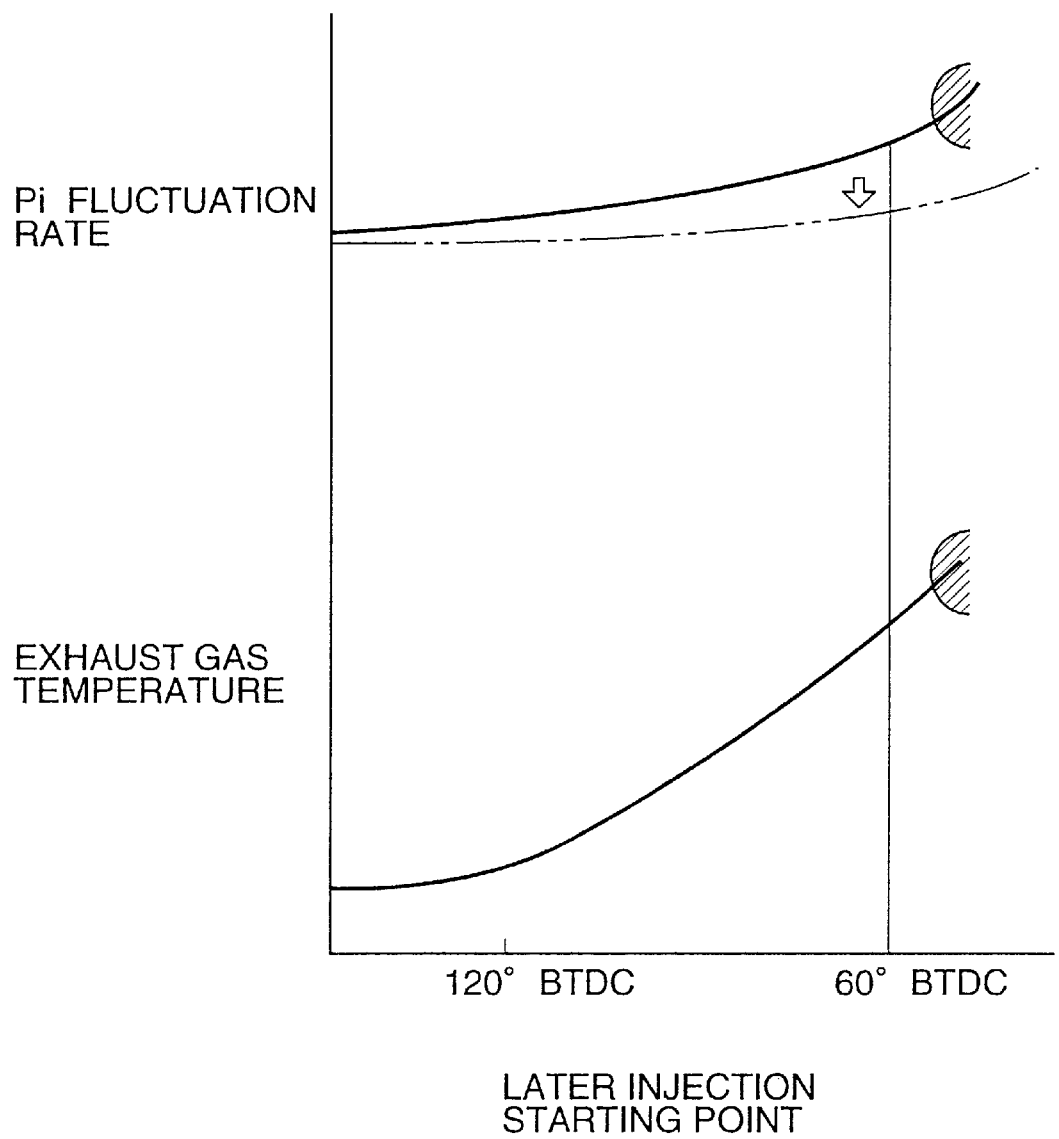
FIG. 12 is a diagram showing variations in Pi fluctuation rate and other parameter observed when later injection start timing is varied in various ways.

FIG. 12 shows the relationship between later injection start timing and the Pi fluctuation rate and exhaust gas temperature examined under operating conditions of an engine speed of 1500 rpm, a brake mean effective pressure (Pe) of 294 kPa and an engine cooling water temperature of 40.0° C., in which the ignition timing was retarded to the top dead center (TDC) on compression stroke.

As can be seen from this Figure, the exhaust gas temperature increasing effects are scarcely obtained if the later injection starting point precedes 120° BTDC when the catalyst is in its unheated state and the engine is cold. The exhaust gas temperature increasing effects are enhanced when the later injection starting point is retarded to or beyond 120° BTDC. When the Pi fluctuation rate increases and the later injection starting point is further retarded beyond 60° BTDC, however, the Pi fluctuation rate exceeds its permissible level and the combustion stability is lost.

If the later injection starting point is set within a range of 120° BTDC to 60° BTDC when the ignition point is retarded to TDC in cold engine condition with a cooling water temperature of about 40° C., it is possible to provide appropriate fuel evaporation and atomization times and, as a consequence, the exhaust gas temperature increasing effects are obtained while securing the combustion stability. As it is possible to enhance the combustion stability if the amount of ignition timing retardation is made small, the later injection starting point can be retarded beyond the above range. When the engine is in an extreme low-load range in which the amount of injected fuel is small or when the amount of fuel injected by the later injection is relatively small, it is possible to sufficiently retard the ignition point while keeping the later injection starting point in a range not later than 45° BTDC because fuel evaporation and atomization can be made relatively easily in these conditions.

The combustion stability is enhanced when the engine temperature (cooling water temperature) increases, because fuel evaporation and atomization are prompted at high temperatures. It follows that even when the catalyst is in its unheated state, the Pi fluctuation rate is decreased and the permissible range of the later injection point in which the Pi fluctuation rate does not exceed its permissible level extends to the retarding side as shown by an alternate long and two short dashed line in FIG. 12 compared to the case of the cold engine condition (shown by a solid line) if the engine temperature is high.

When the catalyst is in its unheated state and the engine temperature is low, the later injection point θad is made equal to the basic later injection point θadb which has been set within a range in which the combustion stability is maintained under that temperature condition as described earlier. When the catalyst is in its unheated state but the engine temperature has become higher than the specified temperature, however, the later injection point θad is retarded from the basic later injection point θadb by an amount corresponding to the increase in the combustion stability. Since the later injection point θad is retarded as much as possible within the range in which the combustion stability is maintained in the above-described fashion, the exhaust gas temperature increasing effect is increased as is apparent from FIG. 12, and the HC the NOx reduction effect is also increased correspondingly.

If there is made an arrangement to enhance turbulence within the combustion chamber 5 by turbulence enhancing means like the swirl control valve 17 shown in FIG. 1 when the aforementioned split injection is conducted while the catalyst is still in its unheated state, the combustion stability is increased by the enhanced turbulence. Accordingly, even when the later injection starting point is relatively retarded to increase the quick light-off effects in the split injection mode, it is possible to maintain the combustion stability while avoiding an increase in the Pi fluctuation rate and to increase the maximum permissible amount of ignition timing retardation, so that the catalyst quick light-off operation is even more performed.

When the catalyst is in its unheated state and the engine temperature is higher than the specified temperature, the later injection point θad is retarded compared to the case in which the engine temperature is equal to or lower than the specified temperature in this embodiment. In addition to, or instead of, this operation, the proportion of the fuel injected by the later injection may be increased when the catalyst is in its unheated state and the engine temperature is higher than the specified temperature. This is also effective for performing the catalyst quick light-off operation.

Specifically, the more the proportion of the fuel injected by the later injection is increased in the split injection mode, the more the exhaust gas temperature increasing effects and HC and NOx reduction effects are increased but the Pi fluctuation rate is also increased according to the data shown in FIG. 11. If the proportion of the fuel injected by the later injection exceeds 80% when the catalyst is in its unheated state and the engine temperature is low, the Pi fluctuation rate exceeds its permissible level and the combustion stability is lost. When the engine temperature (cooling water temperature) becomes higher, however, the combustion stability is increased and the Pi fluctuation rate is reduced, so that the combustion stability can be maintained even when the proportion of the fuel injected by the later injection is increased compared to the case of the cold engine condition.

In one typical example in which the proportion of the fuel injected by the later injection is increased when the catalyst is in its unheated state and the engine temperature is high as described above, the proportion of the fuel injected by the later injection may be set to 100%, or one-time injection may be made in the compression stroke. This example of compression stroke one-time injection is described referring to the flowchart of FIGS. 13A and 13B.

Figure 13A:
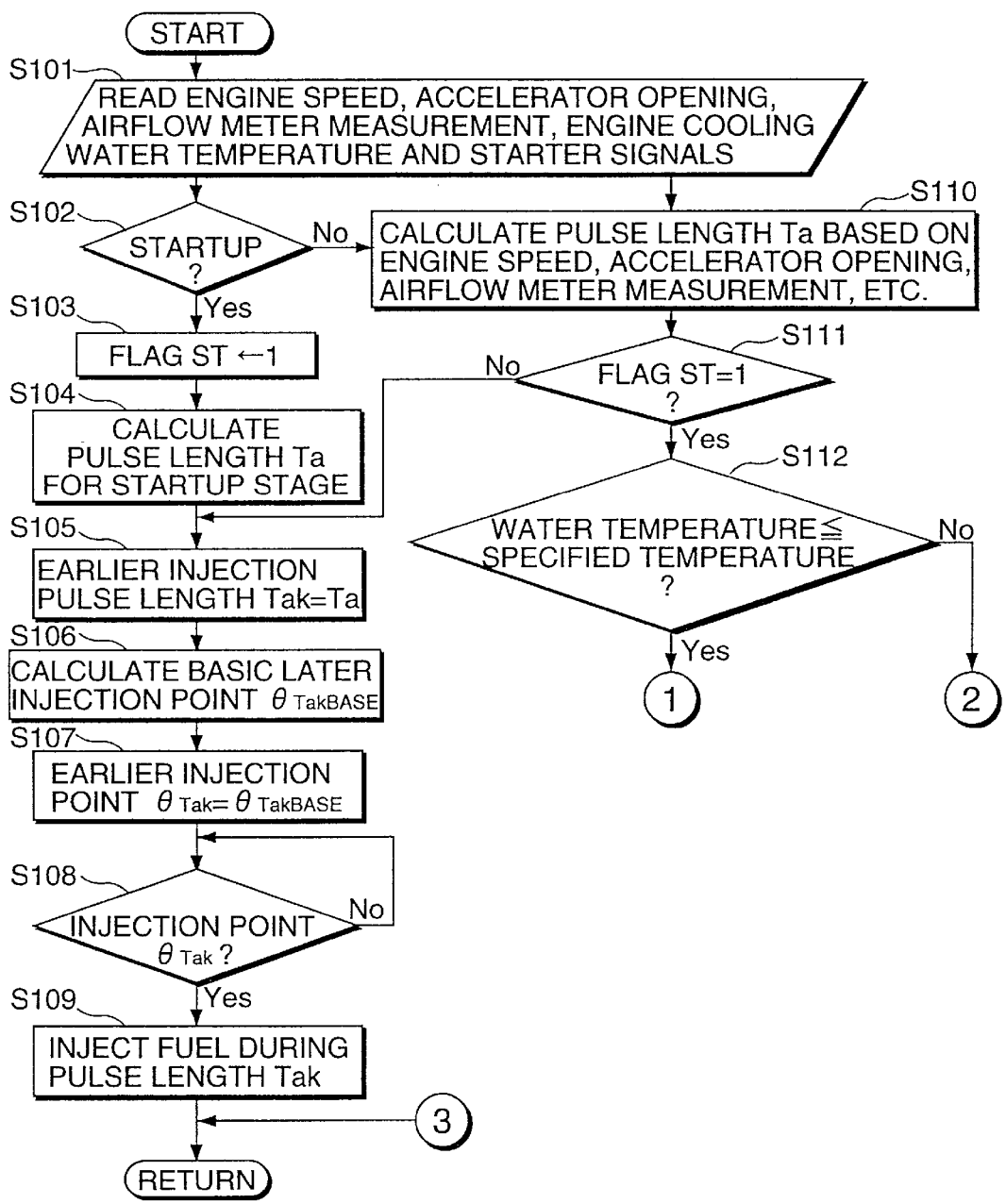
FIGS. 13A and 13B are a flowchart showing another example of a routine for controlling fuel injection and other operation in the direct injection engine.
Figure 13B:
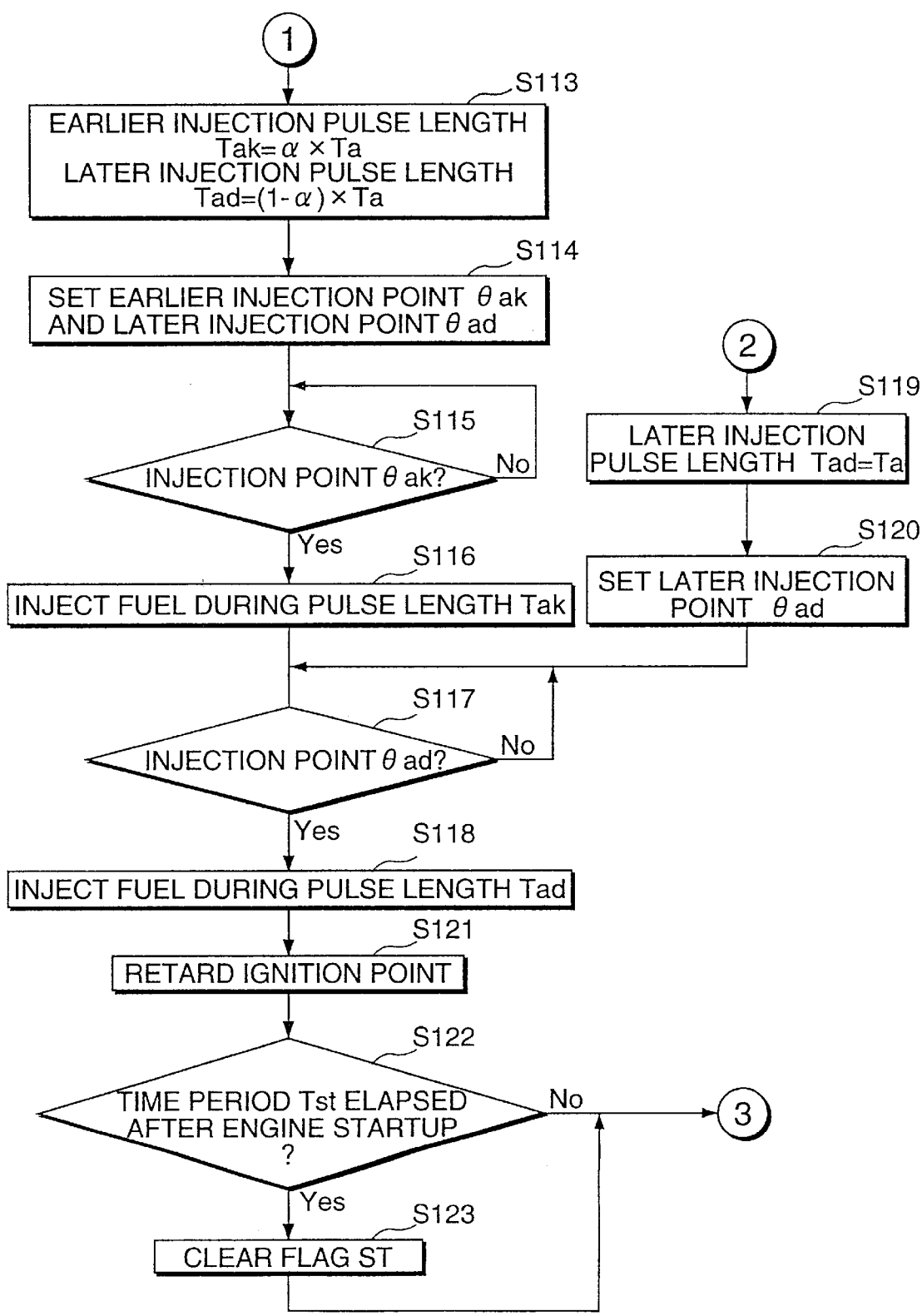

Steps S101 to S111 of the flowchart of FIG. 13A are identical to steps S1 to S11 of the flowchart of FIG. 4. When the value of the flag ST is judged to be "1" in step S111, that is, when the catalyst is judged to be in its unheated state within the specified time period after engine startup, a further judgment is made in step S112 to determine whether the cooling water temperature is equal to or less than a specified temperature.

If the cooling water temperature is judged to be equal to or less than the specified temperature in step S112, the earlier injection pulse length Tak and later injection pulse length Tad for split injection are calculated in step S113 (in the same way as step S12 of FIG. 4). In step S113, the earlier injection point θak is set at a proper point within the intake stroke and the later injection point θad is set at a proper point within the middle portion of the compression stroke or later.

Fuel injection is made during the pulse length Tak when the earlier injection point θak is reached (steps S115, S116). Fuel injection is made again during the pulse length Tad when the later injection point θad is reached (steps S117, S118). Further, the ignition timing controller 35 performs the control operation for retarding the ignition point in step S121 and then the operation flow proceeds to step S122.

On the other hand, if the cooling water temperature is judged to be higher than the specified temperature in step S112 when the catalyst is judged to be in its unheated state in step S112, the later injection pulse length Tad is set to the pulse length Ta corresponding to the total amount of fuel to be injected in step S119 for conducting compression stroke one-time injection. Then, the later injection point θad is set in step S120. Fuel injection is made during the pulse length Tad when the later injection point θad is reached (steps S117, S118). Further, the ignition timing controller 35 performs the control operation for retarding the ignition point in step S121 and then the operation flow proceeds to step S122.

Step S122 judges whether the preset time period Tst has elapsed after engine startup in the same way as step S20 of FIG. 4. When the result of this judgment is in the affirmative, the flag ST is cleared in step S123 in the same way as step S21 of FIG. 4.

Figure 14A:
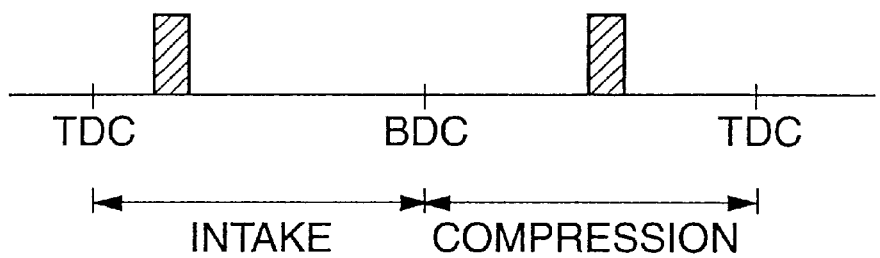
FIGS. 14A and 14B are diagrams showing fuel injection timing set in accordance with control operation of FIGS. 13A and 13B when the catalyst is in its unheated state and the engine temperature is low, and when the catalyst is in its unheated state and the engine temperature is high, respectively.

According to this example of control operation, split injection including the earlier injection cycle performed in the intake stroke and the later injection cycle performed in the middle portion of the compression stroke or later is conducted as shown in FIG. 14A when the catalyst is in its unheated state and the engine temperature is low. Since the proportions of fuel injected in the individual injection cycles and injection starting points are set within the earlier-mentioned specified ranges (see FIGS. 11–12) in this case, the HC and NOx reduction and catalyst quick light-off effects are obtained while maintaining the combustion stability even under such conditions that the fuel would not be easily evaporated or atomized due to the low engine temperature.

Figure 14B:
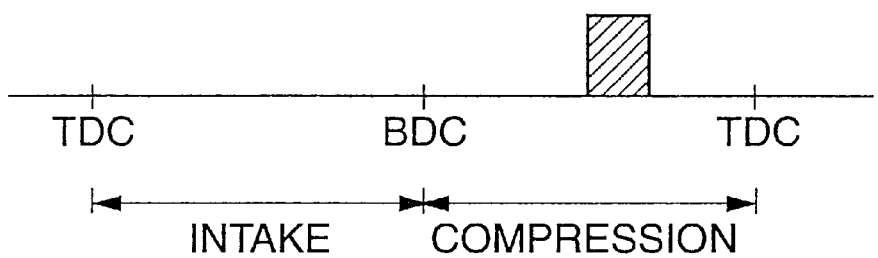

On the other hand, the more the proportion of the fuel injected by the later injection is increased within the range in which the combustion stability is maintained, the more the exhaust gas temperature increasing effects and HC and NOx reduction effects are increased (see FIG. 11). When the engine temperature increases, it becomes easier for the fuel to be evaporated and atomized. In this case, the combustion stability is maintained even when the proportion of the fuel injected by the later injection is increased. Accordingly, when the catalyst is in its unheated state and the engine temperature is higher than the specified temperature, the proportion of the fuel injected by the later injection is increased to a maximum level, and as a consequence, compression stroke one-time injection depicted in FIG. 14B is performed. This serves to enhance the HC and NOx reduction and catalyst quick light-off effects in an effective manner.

The construction of the above-described control device for the direct injection engine of the foregoing embodiment can be modified in various ways.

For example, there may be provided a second $O_2$ sensor 21' downstream of the catalytic converter 22 as shown by alternate long and two short dashed lines in FIG. 1 in addition to the $O_2$ sensor 21 provided upstream of the catalytic converter 22. Although the identifier 31 makes a judgment as to whether the catalyst is in its unheated state based on the time elapsed from engine startup in the foregoing embodiment, the same judgment can be made based on a comparison between outputs of the two $O_2$ sensors 21, 21' in this variation of the embodiment. More specifically, the oxygen concentration in the exhaust gases varies due to reaction of the catalyst when it has been activated. Thus, it is possible to judge that the catalyst is in its unheated state when the outputs of the two $O_2$ sensors 21, 21' coincide with each other and that the catalyst has been heated when the outputs of the two $O_2$ sensors 21, 21' differ from each other.

In another alternative, there may be provided a temperature sensor for directing sensing the catalyst temperature so that the aforementioned judgment as to whether the catalyst is in its unheated state can be made based on a sensing signal fed from the temperature sensor.

Moreover, although the later injection point is retarded in the split injection mode when the catalyst is in its unheated state and the engine temperature is higher than the specified temperature in the control operation shown in FIG. 4, this may be modified such that the earlier injection point, or both the earlier and later injection points, are retarded.

As described above, an inventive control device for a direct injection engine having a catalyst provided in an exhaust gas passage for converting exhaust gases and an injector for injecting fuel directly into a combustion chamber comprises an identifier for judging whether the catalyst is in its unheated state in which its temperature is lower than its activation temperature, an engine temperature state detector for sensing the temperature state of the engine, and a fuel injection controller for controlling fuel injection from the injector, wherein the fuel injection controller controls the injector based on judgment results of the identifier and on sensing results of the engine temperature state detector in such a way that the injector makes at least two-step split injection during a period from an intake stroke to an ignition point including a later injection cycle performed in a middle portion of a compression stroke or later and an earlier injection cycle performed prior to the later injection cycle when the catalyst is in its unheated state.

Also, the fuel injection controller controls the injector in such a way that at least one of the injection cycles is retarded when the catalyst is still in its iunheated state but the engine temperature has become higher than a specified temperature compared to a case where the temperature of the engine is equal to or lower than the specified temperature.

In this construction, the injector makes split injection when the catalyst is in its unheated state. The later injection cycle performed in the middle portion of the compression stroke or later produces unevenness in a mixture in which locally rich mixture masses are created. Since relatively rich mixture masses are scattered or locally distributed near a spark plug, ignitability and combustion stability after ignition are ensured, and because a uniform and lean mixture is formed by the earlier injection cycle, the combustion slows down in a latter part of the combustion period and continues until a relatively later time. Due to such a burning process, HC and NOx in the exhaust gases released from the combustion chamber are reduced, resulting in an improvement in emissions while the catalyst is in its unheated state, and the exhaust gas temperature is increased so that catalyst quick light-off operation is significantly performed.

Especially because at least one of the injection cycles (e.g., the later injection cycle) is retarded compared to the case where the temperature of the engine is equal to or lower than the specified temperature when the catalyst is still in its unheated state but the engine temperature has become higher than the specified temperature, HC and NOx reduction and exhaust gas temperature increasing effects are achieved effectively while maintaining the combustion stability in accordance with the engine temperature state when the catalyst is in its unheated state. Even if the catalyst is in its unheated state, it becomes easier for the fuel to be evaporated and atomized and the combustion stability is increased when the engine temperature becomes high. Although ignition timing retardation is rather disadvantageous for evaporation and atomization of the fuel, the ignition point is shifted in a direction which is advantageous for decreasing HC and NOx and increasing the exhaust gas temperature and, as a consequence, it becomes possible to increase emission improvement and quick light-off effects.

Alternatively, further, the fuel injection controller controls the injector based on judgment results of the identifier and on sensing results of the engine temperature state detector in such a way that the ratio of the amount of fuel injected in the later injection cycle to the total amount of fuel injected during the period from the intake stroke to the ignition point is increased when the catalyst is still in its unheated state but the engine temperature has become higher than a specified temperature compared to a case where the temperature of the engine is equal to or lower than the specified temperature.

In this construction, it is also possible to decrease HC and NOx in the exhaust gases and increase the exhaust gas temperature by performing the split injection when the catalyst is in its unheated state. Especially because the proportions of fuel injected in the individual injection cycles are adjusted in accordance with the engine temperature state when the catalyst is in its unheated state, the HC and NOx reduction and exhaust gas temperature increasing effects are achieved satisfactorily while maintaining the combustion stability.

Alternatively, moreover, the fuel injection controller controls the injector based on judgment results of the identifier and on sensing results of the engine temperature state detector in such a way that the injector makes split injection when the catalyst is in its unheated state and the temperature of the engine is equal to or lower than a specified temperature, and the injector makes one-time injection during the compression stroke when the catalyst is still in its unheated state but the engine temperature has become higher than the specified temperature.

In this construction, mode of fuel injection is switched between the split injection and the compression stroke one-time injection in accordance with the engine temperature state when the catalyst is in its unheated state. As a consequence, the HC and NOx reduction and exhaust gas temperature increasing effects are achieved satisfactorily while maintaining the combustion stability.

The engine may be preferably controlled in the same way as when the catalyst is in its unheated state but the engine temperature has become higher than the specified temperature for a specified period of time after hot engine restart in which the engine temperature is already higher than the specified temperature at the point of engine startup.

Also, the amount of fuel injected in the earlier injection cycle may be preferably adjusted such that it creates a lean mixture having an air-fuel ratio higher than the stoichiometric air-fuel ratio and capable of flame propagation at least by combustion of the fuel injected in the later injection cycle in the combustion chamber when performing the split injection while the catalyst is in its unheated state.

In this construction, the fuel injected in the earlier injection cycle spreads throughout the combustion chamber and creates a lean mixture therein, and when combustion of a mixture produced by the later injection cycle proceeds, flame propagates to the lean mixture which was produced by the earlier injection cycle and mixed with part of the fuel injected in the later injection cycle.

The air-fuel ratio within the entire combustion chamber may preferably be set to fall within a range of 13 to 17 when the catalyst is in its unheated state. A reason why it is preferred to set the air-fuel ratio between 13 and 17 is that high heat release efficiency is achieved and an air-fuel ratio capable of increasing the exhaust gas temperature is obtained in this range.

The air-fuel ratio may be properly controlled if the control device further comprises an $O_2$ sensor for detecting the air-fuel ratio and an injection amount calculator for calculating the amount of fuel to be injected by feedback control based on an output of the $O_2$ sensor after it has become activated when the catalyst is in its unheated state.

Preferably, the identifier judges whether the catalyst is in its unheated state based on the time elapsed from cold engine startup in which the engine temperature is equal to or lower than the specified temperature at the beginning. Alternatively, the control device may further comprise a pair of $O_2$ sensors provided one each on upstream and downstream sides of the catalyst in the exhaust gas passage for detecting oxygen concentration therein, so that the identifier can judge whether the catalyst is in its unheated state based on a comparison between outputs of the two $O_2$ sensors.

Such an arrangement makes it possible to easily judge whether the catalyst is in its unheated state in a proper way.

On the other hand, the engine temperature state detector may sense the temperature state of the engine based on the temperature of engine cooling water.

The control device may be further provided with an ignition timing controller for controlling the ignition point of the engine so that the ignition point can be retarded by a specified amount from the point of MBT regardless of the engine temperature when the catalyst is in its unheated state. This serves to increase the quick light-off effects.

Also the control device may be further provided with a turbulence enhancer for enhancing turbulence within the combustion chamber when the catalyst is in its unheated state. With this arrangement, the turbulence enhanced when the catalyst is in its unheated state increases the combustion stability as well as the maximum permissible amount of ignition timing retardation. As a result, the catalyst quick light-off operation is even more performed.

As this invention may be embodied in several forms without departing from the spirit of essential characteristics of the invention, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A control device for a direct injection engine having a catalyst provided in an exhaust gas passage for converting exhaust gases and an injector for injecting fuel directly into a combustion chamber, the control device comprising:

an identifier for judging whether the catalyst is in its unheated state in which its temperature is lower than its activation temperature;

an engine temperature state detector for sensing the temperature state of the engine, and a fuel injection controller for controlling fuel injection from the injector, the fuel injection controller controlling the injector based on judgment results of the identifier and on sensing results of the engine temperature state detector in such a way that the injector makes at least two-step split injection during a period from an intake stroke to an ignition point including a later injection cycle performed in a middle portion of a compression stroke or later and an earlier injection cycle performed prior to the later injection cycle when the catalyst is in its unheated state, and the later injection cycle is retarded but performed prior to the ignition point when the catalyst is still in its unheated state but the engine temperature has become higher than a specified temperature compared to a case where the temperature of the engine is equal to or lower than the specified temperature.

2. A control device for a direct injection engine according to claim 1, wherein the engine is controlled in the same way as when the catalyst is in its unheated state but the engine temperature has become higher than the specified temperature for a specified period of time after hot engine restart in which the engine temperature is already higher than the specified temperature at the point of engine startup.

3. A control device for a direct injection engine according to claim 1, wherein the air-fuel ratio within the entire combustion chamber is set to fall within a range of 13 to 17 when the catalyst is in its unheated state.

4. A control device for a direct injection engine according to claim 3, wherein the control device further comprises:

an $O_2$ sensor for detecting the air-fuel ratio; and an injection amount calculator for calculating the amount of fuel to be injected by feedback control based on an output of the $O_2$ sensor after it has become activated when the catalyst is in its unheated state.

5. A control device for a direct injection engine according to claim 1, wherein the identifier judges whether the catalyst is in its unheated state based on the time elapsed from cold engine startup in which the engine temperature is equal to or lower than the specified temperature at the beginning.

6. A control device for a direct injection engine according to claim 1, wherein the engine temperature state detector senses the temperature state of the engine based on the temperature of engine cooling water.

7. A control device for a direct injection engine according to claim 1, wherein the control device further comprises an ignition timing controller for controlling the ignition point of the engine, and the ignition point is retarded by a specified amount from a minimum spark advance for best torque (MBT) regardless of the engine temperature when the catalyst is in its unheated state.

8. A control device for a direct injection engine having a catalyst provided in an exhaust gas passage for converting exhaust gases and an injector for injecting fuel directly into a combustion chamber, the control device comprising:

an identifier for judging whether the catalyst is in its unheated state in which its temperature is lower than its activation temperature;

an engine temperature state detector for sensing the temperature state of the engine, and a fuel injection controller for controlling fuel injection from the injector, the fuel injection controller controlling the injector based on judgment results of the identifier and on sensing results of the engine temperature state detector in such a way that the injector makes at lest two-step split injection during a period from aW intake stroke to an ignition point including a later injection cycle performed in a middle portion of a compression stroke or later and an earlier injection cycle performed prior to the later injection cycle when the catalyst is in its unheated state, and at least one of the injection cycles is retarded but performed prior to the ignition point when the catalyst is still in its unheated state but the engine temperature has become higher than a specified temperature compared to a case where the temperature of the engine is equal to or lower than the specified temperature, wherein the amount of fuel injected in the earlier injection cycle is adjusted such that it creates a lean mixture having an air-fuel ratio higher than the stoichiometric air-fuel ratio and capable of flame propagation at least by combustion of the fuel injected in the later injection cycle in the combustion chamber when performing the split injection while the catalyst is in its unheated state.

9. A control device for a direct injection engine having a catalyst provided in an exhaust gas passage for converting exhaust gases and an injector for injecting fuel directly into a combustion chamber, the control device comprising:

an identifier for judging whether the catalyst is in its unheated state in which its temperature is lower than its activation temperature;

a pair of $O_2$ sensors provided one each on upstream and downstream sides of the catalyst in the exhaust gas passage for detecting oxygen concentration therein, and the identifier judges whether the catalyst is in its unheated state based on a comparison between outputs of the two $O_2$ sensors;

an engine temperature state detector for sensing the temperature state of the engine, and a fuel injection controller for controlling fuel injection from the injector, the fuel injection controller controlling the injector based on judgment results of the identifier and on sensing results of the engine temperature state detector in such a way that the injector makes at least two-step split injection during a period from an intake stroke to an ignition point including a later injection cycle performed in a middle portion of a compression stroke or later and an earlier injection cycle performed prior to the later injection cycle when the catalyst is in its unheated state, and at least one of the injection cycles is retarded but performed prior to the ignition point when the catalyst is still in its unheated state but the engine temperature has become higher than a specified temperature compared to a case where the temperature of the engine is equal to or lower than the specified temperature.

10. A control device for a direct injection engine having a catalyst provided in an exhaust gas passage for converting exhaust gases and an injector for injecting fuel directly into a combustion chamber, the control device comprising:

an identifier for judging whether the catalyst is in its unheated state in which its temperature is lower than its activation temperature;

a turbulence enhancer for enhancing turbulence within the combustion chamber when the catalyst is in its unheated state;

an engine temperature state detector for sensing the temperature state of the engine, and a fuel injection controller for controlling fuel injection from the injector, the fuel injection controller controlling the injector based on judgment results of the identifier and on sensing results of the engine temperature state detector in such a way that the injector makes at least two-step split injection during a period from an intake stroke to an ignition point including a later injection cycle performed in a middle portion of a compression stroke or later and an earlier injection cycle performed prior to the later injection cycle when the catalyst is in its unheated state, and at least one of the injection cycles is retarded but performed prior to the ignition point when the catalyst is still in its unheated state but the engine temperature has become higher than a specified temperature compared to a case where the temperature of the engine is equal to or lower than the specified temperature.

11. A control device for a direct injection engine having a catalyst provided in an exhaust gas passage for converting exhaust gases and an injector for injecting fuel directly into a combustion chamber, the control device comprising:

an identifier for judging whether the catalyst is in its unheated state in which its temperature is lower than its activation temperature;

an engine temperature state detector for sensing the temperature state of the engine; and a fuel injection controller for controlling fuel injection from the injector, the fuel injection controller controlling the injector based on judgment results of the identifier and on sensing results of the engine temperature state detector in such a way that the injector makes at least two-step split injection during a period from an intake stroke to an ignition point including a later injection cycle performed in a middle portion of a compression stroke or later and an earlier injection cycle performed prior to the later injection cycle when the catalyst is in its unheated state, and the ratio of the amount of fuel injected in the later injection cycle to the total amount of fuel injected during the period from the intake stroke to the ignition point is increased when the catalyst is still in its unheated state but the engine temperature has become higher than a specified temperature compared to a case where the temperature of the engine is equal to or lower than the specified temperature.

* * * * *